United States Patent
Kung et al.

(10) Patent No.: US 11,937,334 B2
(45) Date of Patent: Mar. 19, 2024

(54) METHOD AND APPARATUS FOR SIDELINK DISCONTINUOUS RECEPTION IN A WIRELESS COMMUNICATION SYSTEM

(71) Applicant: ASUSTek Computer Inc., Taipei (TW)

(72) Inventors: Yi-Hsuan Kung, Taipei (TW); Li-Chih Tseng, Taipei (TW); Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 18/119,179

(22) Filed: Mar. 8, 2023

(65) Prior Publication Data

US 2023/0292397 A1 Sep. 14, 2023

Related U.S. Application Data

(60) Provisional application No. 63/318,174, filed on Mar. 9, 2022.

(51) Int. Cl.
*H04W 76/28* (2018.01)
*H04W 72/0446* (2023.01)
(Continued)

(52) U.S. Cl.
CPC ....... *H04W 76/28* (2018.02); *H04W 72/0446* (2013.01); *H04W 72/1263* (2013.01); *H04W 72/20* (2023.01)

(58) Field of Classification Search
CPC ............. H04W 76/28; H04W 72/0446; H04W 72/1263; H04W 72/20
See application file for complete search history.

(56) References Cited

U.S. PATENT DOCUMENTS

2019/0098689 A1* 3/2019 Wei .................... H04W 72/23

FOREIGN PATENT DOCUMENTS

| WO | 2021119474 A1 | 6/2021 |
| WO | 2021147959 A1 | 7/2021 |

OTHER PUBLICATIONS

ZTE Corporation Further Consideration on SL DRX Configuration (Year: 2021).*

(Continued)

*Primary Examiner* — Ayanah S George
(74) *Attorney, Agent, or Firm* — Skaar Ulbrich Macari, P.A.

(57) ABSTRACT

Methods, systems, and apparatuses for Sidelink Discontinuous Reception (SL DRX) in a wireless communication system to avoid ambiguity on slot offset calculations on SL DRX. A method for a UE comprises performing a SL communication associated with a destination Identity (ID), having a SL DRX configuration associated with the SL communication, wherein the SL DRX configuration comprises at least an on-duration timer and a DRX cycle, deriving a first offset associated with the SL communication based on the destination ID and the DRX cycle, deriving a second offset associated with the SL communication based on the destination ID and a number of slots per subframe, starting the on-duration timer after a time period determined based on the second offset from the beginning of a subframe, wherein the subframe is determined based on at least the first offset, and monitoring Sidelink Control Information (SCI) when the on-duration timer is running.

16 Claims, 11 Drawing Sheets

(51) Int. Cl.
H04W 72/1263 (2023.01)
H04W 72/20 (2023.01)

(56) References Cited

OTHER PUBLICATIONS

"Summary of [POST115-e][715][V2X/SL] (vivo)"; 3GPP TSG-RAN WG2 #116e; R2-xxxxxxx; Nov. 1-12, 2021; 11 pages.
"Stage 2 Running CR of TS 38.300 for eSL"; 3GPP TSG-RAN WG2 Meeting #116 Electronic; R2-2111434; Nov. 2021; 18 pages.
"Further consideration on SL DRX configuration"; 3GPP TSG-RAN WG2 Meeting #115 electronic; R2-2107433; Aug. 16-27, 2021; 8 pages.
ZTE: "Running CR of TS 38.304 for eSL", 3GPP Draft; R2-2200265, Jan. 11, 2022, 15 pages.
Vivo: "Summary of [POST115-e] [715] [V2X/SL] (vivo)", 3GPP Draft; R2-2110680, Oct. 22, 2021, 20 pages.
Qualcomm Incorporated: "Discussion on Remaining Design Aspects for SL DRX", 3GPP Draft; R2-2201624, Jan. 11, 2022, 4 pages.
Extended European Search Report to the corresponding European patent application rendered by the European Patent Office (EPO) dated Jul. 31, 2023, 12 pages.

\* cited by examiner

| $\mu$ | $\Delta f = 2^\mu \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 7 (PRIOR ART)

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 8 (PRIOR ART)

| Transition time | FR1 | FR2 |
|---|---|---|
| $N_{Tx-Rx}$ | 25600 | 13792 |
| $N_{Rx-Tx}$ | 25600 | 13792 |

FIG. 9 (PRIOR ART)

Example 1: number of slots per subframe = 2,
Destination Layer-2 ID = 0, 1, 2...

*sl-drx-SlotOffset* = 0/2 ms , 1/2 ms (or 16/32ms)

Example 2: number of slots per subframe = 4,
Destination Layer-2 ID = 0, 1, 2...

*sl-drx-SlotOffset* = 0/4 ms , 1/4 ms (or 8/32ms), 2/4ms, 3/4ms

METHOD AND APPARATUS FOR SIDELINK DISCONTINUOUS RECEPTION IN A WIRELESS COMMUNICATION SYSTEM

CROSS-REFERENCE TO RELATED APPLICATIONS

The present Application claims priority to and the benefit of U.S. Provisional Patent Application Ser. No. 63/318,174, filed Mar. 9, 2022, which is fully incorporated herein by reference.

FIELD

This disclosure generally relates to wireless communication networks and, more particularly, to a method and apparatus for sidelink discontinuous reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for Sidelink Discontinuous Reception (SL DRX) in a wireless communication system to avoid ambiguity on slot offset calculations on SL DRX. In various embodiments, with this and other concepts, systems, and methods of the present invention, a method for a UE in a wireless communication system comprises performing a SL communication associated with a destination Identity (ID), having or being configured with a SL DRX configuration associated with the SL communication, wherein the SL DRX configuration comprises at least an on-duration timer and a DRX cycle, deriving a first offset associated with the SL communication based on the destination ID and the DRX cycle, deriving a second offset associated with the SL communication based on the destination ID and a number of slots per subframe, starting the on-duration timer after a time period determined based on the second offset from the beginning of a subframe, wherein the subframe is determined based on at least the first offset, and monitoring Sidelink Control Information (SCI) when the on-duration timer is running.

BRIEF DESCRIPTION OF THE DRAWINGS

FIG. 7 is a reproduction of Table 4.3.2-1: Number of OFDM symbols per slot, slots per frame, and slots per subframe for normal cyclic prefix, from 3GPP TS 38.211 V16.8.0.

FIG. 8 is a reproduction of Table 4.3.2-2: Number of OFDM symbols per slot, slots per frame, and slots per subframe for extended cyclic prefix, from 3GPP TS 38.211 V16.8.0.

FIG. 9 is a reproduction of Table 4.3.2-3: Transition time $N\_$"Rx-Tx" and $N\_$"Tx-Rx", from 3GPP TS 38.211 V16.8.0.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.321 V16.7.0; [2] 3GPP TS 38.331 V16.7.0; [3] 3GPP RAN2 #116-e meeting report; [4] 3GPP RAN2 #117-e meeting report; [5] Draft R2-2203673 CR of TS 38.321 for Sidelink enhancement; [6] Draft R2-2203672 RRC CR for NR Sidelink enhancement; and [7] 3GPP TS 38.211 V16.8.0. The standards and documents listed above are hereby expressly and fully incorporated herein by reference in their entirety.

Figure 1:
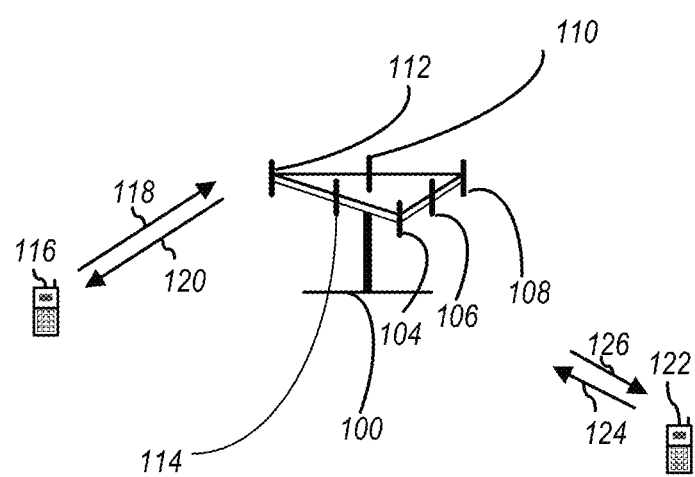
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
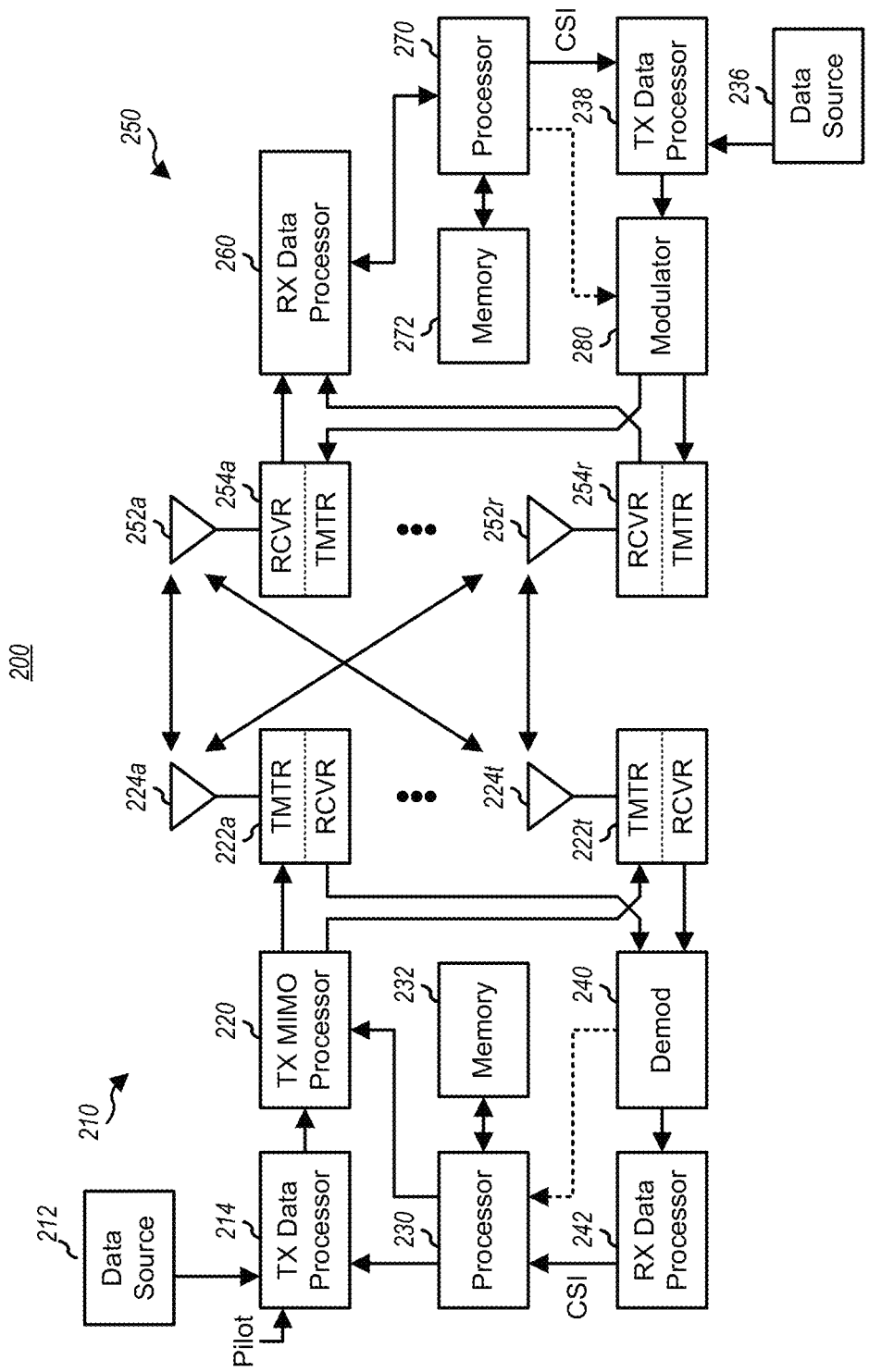
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
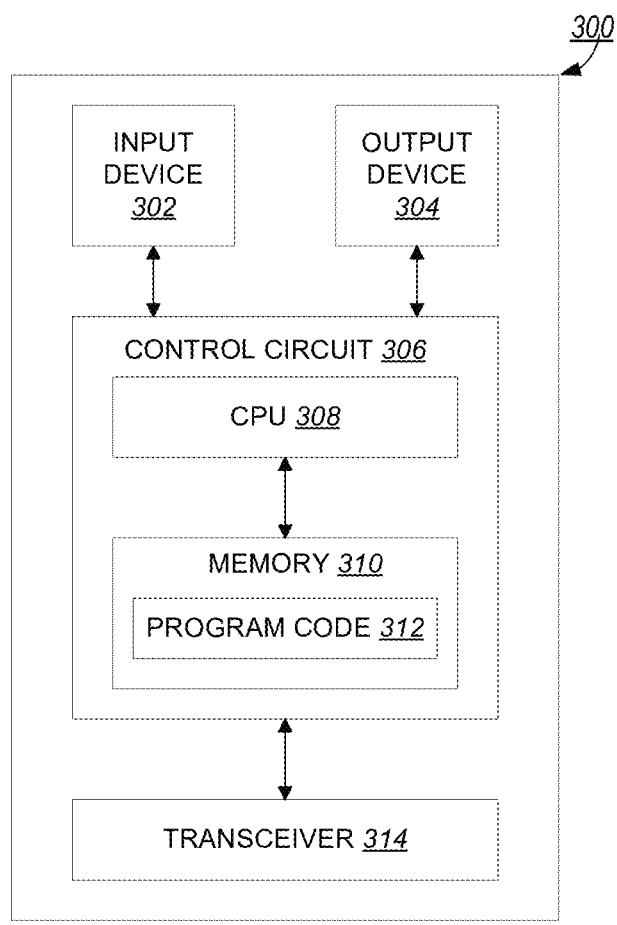
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the $N_R$ system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
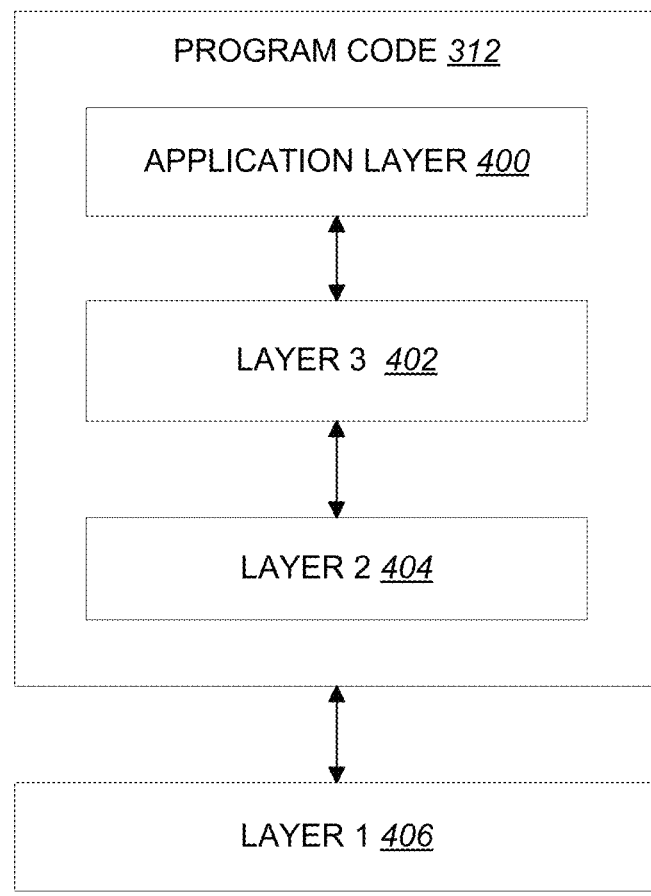
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or $N_R$ systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In 3GPP specification 38.321([1] 3GPP TS 38.321 V16.7.0), discontinuous reception (DRX), and Sidelink communication are introduced:

5.4 UL-SCH Data Transfer
5.4.1 UL Grant Reception
Uplink grant is either received dynamically on the PDCCH, in a Random Access Response, configured semi-persistently by RRC or determined to be associated with the PUSCH resource of MSGA as specified in clause 5.1.2a. The MAC entity shall have an uplink grant to transmit on the UL-SCH. To perform the requested transmissions, the MAC layer receives HARQ information from lower layers. An uplink grant addressed to CS-RNTI with NDI=0 is considered as a configured uplink grant. An uplink grant addressed to CS-RNTI with NDI=1 is considered as a dynamic uplink grant. If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

1> if an uplink grant for this Serving Cell has been received on the PDCCH for the MAC entity's C-RNTI or Temporary C-RNTI; or
1> if an uplink grant has been received in a Random Access Response:
  2> if the uplink grant is for MAC entity's C-RNTI and if the previous uplink grant delivered to the HARQ entity for the same HARQ process was either an uplink grant received for the MAC entity's CS-RNTI or a configured uplink grant:
    3> consider the NDI to have been toggled for the corresponding HARQ process regardless of the value of the NDI.
  2> if the uplink grant is for MAC entity's C-RNTI, and the identified HARQ process is configured for a configured uplink grant:
    3> start or restart the configuredGrantTimer for the corresponding HARQ process, if configured.
    3> stop the cg-RetransmissionTimer for the corresponding HARQ process, if running.
  2> deliver the uplink grant and the associated HARQ information to the HARQ entity.
1> else if an uplink grant for this PDCCH occasion has been received for this Serving Cell on the PDCCH for the MAC entity's CS-RNTI:
  2> if the NDI in the received HARQ information is 1:
    3> consider the NDI for the corresponding HARQ process not to have been toggled;
    3> start or restart the configuredGrantTimer for the corresponding HARQ process, if configured;
    3> stop the cg-RetransmissionTimer for the corresponding HARQ process, if running;
    3> deliver the uplink grant and the associated HARQ information to the HARQ entity.
  2> else if the NDI in the received HARQ information is 0:
    3> if PDCCH contents indicate configured grant Type 2 deactivation:
      4> trigger configured uplink grant confirmation.
    3> else if PDCCH contents indicate configured grant Type 2 activation:
      4> trigger configured uplink grant confirmation;
      4> store the uplink grant for this Serving Cell and the associated HARQ information as configured uplink grant;
      4> initialise or re-initialise the configured uplink grant for this Serving Cell to start in the associated PUSCH duration and to recur according to rules in clause 5.8.2;

4> stop the configuredGrantTimer for the corresponding HARQ process, if running;
4> stop the cg-RetransmissionTimer for the corresponding HARQ process, if running.

For each Serving Cell and each configured uplink grant, if configured and activated, the MAC entity shall:
1> if the MAC entity is configured with lch-basedPrioritization, and the PUSCH duration of the configured uplink grant does not overlap with the PUSCH duration of an uplink grant received in a Random Access Response or with the PUSCH duration of an uplink grant addressed to Temporary C-RNTI or the PUSCH duration of a MSGA payload for this Serving Cell; or
1> if the MAC entity is not configured with lch-basedPrioritization, and the PUSCH duration of the configured uplink grant does not overlap with the PUSCH duration of an uplink grant received on the PDCCH or in a Random Access Response or the PUSCH duration of a MSGA payload for this Serving Cell:
2> set the HARQ Process ID to the HARQ Process ID associated with this PUSCH duration;
2> if, for the corresponding HARQ process, the configuredGrantTimer is not running and cg-Retransmission Timer is not configured (i.e. new transmission):
3> consider the NDI bit for the corresponding HARQ process to have been toggled;
3> deliver the configured uplink grant and the associated HARQ information to the HARQ entity.
2> else if the cg-RetransmissionTimer for the corresponding HARQ process is configured and not running, then for the corresponding HARQ process:
3> if the configuredGrantTimer is not running, and the HARQ process is not pending (i.e. new transmission):
4> consider the NDI bit to have been toggled;
4> deliver the configured uplink grant and the associated HARQ information to the HARQ entity.
3> else if the previous uplink grant delivered to the HARQ entity for the same HARQ process was a configured uplink grant (i.e. retransmission on configured grant):
4> deliver the configured uplink grant and the associated HARQ information to the HARQ entity.

For configured uplink grants neither configured with harq-ProcID-Offset2 nor with cg-RetransmissionTimer, the HARQ Process ID associated with the first symbol of a UL transmission is derived from the following equation:

HARQ Process ID=[floor(CURRENT_symbol/periodicity)]modulo nrofHARQ-Processes

For configured uplink grants with harq-ProcID-Offset2, the HARQ Process ID associated with the first symbol of a UL transmission is derived from the following equation:

HARQ Process ID=[floor(CURRENT_symbol/periodicity)]modulo nrofHARQ-Processes+harq-ProcID-Offset2 where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211 [8].

For configured uplink grants configured with cg-RetransmissionTimer, the UE implementation selects an HARQ Process ID among the HARQ process IDs available for the configured grant configuration. For HARQ Process ID selection, the UE shall prioritize retransmissions before initial transmissions. The UE shall toggle the NDI in the CG-UCI for new transmissions and not toggle the NDI in the CG-UCI in retransmissions.

NOTE 1: CURRENT_symbol refers to the symbol index of the first transmission occasion of a bundle of configured uplink grant.

NOTE 2: A HARQ process is configured for a configured uplink grant where neither harq-ProcID-Offset nor harq-ProcID-Offset2 is configured, if the configured uplink grant is activated and the associated HARQ process ID is less than nrofHARQ-Processes. A HARQ process is configured for a configured uplink grant where harq-ProcID-Offset2 is configured, if the configured uplink grant is activated and the associated HARQ process ID is greater than or equal to harq-ProcID-Offset2 and less than sum of harq-ProcID-Offset2 and nrofHARQ-Processes for the configured grant configuration.

NOTE 3: If the MAC entity receives a grant in a Random Access Response (i.e. MAC RAR or fallbackRAR), or addressed to Temporary C-RNTI or determines a grant as specified in clause 5.1.2a for MSGA payload and if the MAC entity also receives an overlapping grant for its C-RNTI or CS-RNTI, requiring concurrent transmissions on the SpCell, the MAC entity may choose to continue with either the grant for its RA-RNTI/Temporary C-RNTI/MSGB-RNTI/the MSGA payload transmission or the grant for its C-RNTI or CS-RNTI.

NOTE 4: In case of unaligned SFN across carriers in a cell group, the SFN of the concerned Serving Cell is used to calculate the HARQ Process ID used for configured uplink grants.

NOTE 5: If cg-RetransmissionTimer is not configured, a HARQ process is not shared between different configured grant configurations in the same BWP.

For the MAC entity configured with lch-basedPrioritization, priority of an uplink grant is determined by the highest priority among priorities of the logical channels that are multiplexed (i.e. the MAC PDU to transmit is already stored in the HARQ buffer) or have data available that can be multiplexed (i.e. the MAC PDU to transmit is not stored in the HARQ buffer) in the MAC PDU, according to the mapping restrictions as described in clause 5.4.3.1.2. The priority of an uplink grant for which no data for logical channels is multiplexed or can be multiplexed in the MAC PDU is lower than either the priority of an uplink grant for which data for any logical channels is multiplexed or can be multiplexed in the MAC PDU or the priority of the logical channel triggering an SR.

For the MAC entity configured with lch-basedPrioritization, if the corresponding PUSCH transmission of a configured uplink grant is cancelled by CI-RNTI as specified in clause 11.2A of TS 38.213 [6] or cancelled by a high PHY-priority PUCCH transmission as specified in clause 9 of TS 38.213 [6], this configured uplink grant is considered as a de-prioritized uplink grant. If this deprioritized uplink grant is configured with autonomousTx, the configuredGrantTimer for the corresponding HARQ process of this de-prioritized uplink grant shall be stopped if it is running.

When the MAC entity is configured with lch-basedPrioritization, for each uplink grant delivered to the HARQ entity and whose associated PUSCH can be transmitted by lower layers, the MAC entity shall:
1> if this uplink grant is received in a Random Access Response (i.e. in a MAC RAR or fallback RAR), or addressed to Temporary C-RNTI, or is determined as specified in clause 5.1.2a for the transmission of the MSGA payload:
2> consider this uplink grant as a prioritized uplink grant.
1> else if this uplink grant is addressed to CS-RNTI with NDI=1 or C-RNTI:
2> if there is no overlapping PUSCH duration of a configured uplink grant which was not already de-prioritized, in the same BWP whose priority is higher than the priority of the uplink grant; and
2> if there is no overlapping PUCCH resource with an SR transmission which was not already de-prioritized and the priority of the logical channel that triggered the SR is higher than the priority of the uplink grant:
3> consider this uplink grant as a prioritized uplink grant;
3> consider the other overlapping uplink grant(s), if any, as a de-prioritized uplink grant(s);
3> consider the other overlapping SR transmission(s), if any, as a de-prioritized SR transmission(s).
1> else if this uplink grant is a configured uplink grant:
2> if there is no overlapping PUSCH duration of another configured uplink grant which was not already de-prioritized, in the same BWP, whose priority is higher than the priority of the uplink grant; and
2> if there is no overlapping PUSCH duration of an uplink grant addressed to CS-RNTI with NDI=1 or C-RNTI which was not already de-prioritized, in the same BWP, whose priority is higher than or equal to the priority of the uplink grant; and
2> if there is no overlapping PUCCH resource with an SR transmission which was not already de-prioritized and the priority of the logical channel that triggered the SR is higher than the priority of the uplink grant:
3> consider this uplink grant as a prioritized uplink grant;
3> consider the other overlapping uplink grant(s), if any, as a de-prioritized uplink grant(s);
3> if the de-prioritized uplink grant(s) is a configured uplink grant configured with autonomousTx whose PUSCH has already started:
4> stop the configuredGrantTimer for the corresponding HARQ process of the de-prioritized uplink grant(s).
3> consider the other overlapping SR transmission(s), if any, as a de-prioritized SR transmission(s).
NOTE 6: If the MAC entity is configured with lch-basedPrioritization and if there is overlapping PUSCH duration of at least two configured uplink grants whose priorities are equal, the prioritized uplink grant is determined by UE implementation.
NOTE 7: If the MAC entity is not configured with lch-basedPrioritization and if there is overlapping PUSCH duration of at least two configured uplink grants, it is up to UE implementation to choose one of the configured uplink grants.
NOTE 8: If the MAC entity is configured with lch-basedPrioritization, the MAC entity does not take UCI multiplexing according to the procedure specified in TS 38.213 [6] into account when determining whether the PUSCH duration of an uplink grant overlaps with the PUCCH resource for an SR transmission.

5.4.2 HARQ Operation
5.4.2.1 HARQ Entity
The MAC entity includes a HARQ entity for each Serving Cell with configured uplink (including the case when it is configured with supplementaryUplink), which maintains a number of parallel HARQ processes.
The number of parallel UL HARQ processes per HARQ entity is specified in TS 38.214 [7].
Each HARQ process supports one TB.
Each HARQ process is associated with a HARQ process identifier. For UL transmission with UL grant in RA Response or for UL transmission for MSGA payload, HARQ process identifier 0 is used.
NOTE: When a single DCI is used to schedule multiple PUSCH, the UE is allowed to map generated TB(s) internally to different HARQ processes in case of LBT failure(s), i.e. UE may transmit a new TB on any HARQ process in the grants that have the same TBS, the same RV and the NDIs indicate new transmission.
The maximum number of transmissions of a TB within a bundle of the dynamic grant or configured grant is given by REPETITION_NUMBER as follows:
For a dynamic grant, REPETITION_NUMBER is set to a value provided by lower layers, as specified in clause 6.1.2.1 of TS 38.214 [7];
For a configured grant, REPETITION_NUMBER is set to a value provided by lower layers, as specified in clause 6.1.2.3 of TS 38.214 [7].
If REPETITION_NUMBER>1, after the first transmission within a bundle, at most REPETITION_NUMBER−1 HARQ retransmissions follow within the bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to REPETITION_NUMBER for a dynamic grant or configured uplink grant unless they are terminated as specified in clause 6.1 of TS 38.214 [7]. Each transmission within a bundle is a separate uplink grant delivered to the HARQ entity.
For each transmission within a bundle of the dynamic grant, the sequence of redundancy versions is determined according to clause 6.1.2.1 of TS 38.214 [7]. For each transmission within a bundle of the configured uplink grant, the sequence of redundancy versions is determined according to clause 6.1.2.3 of TS 38.214 [7].
For each uplink grant, the HARQ entity shall:
1> identify the HARQ process associated with this grant, and for each identified HARQ process:
2> if the received grant was not addressed to a Temporary C-RNTI on PDCCH, and the NDI provided in the associated HARQ information has been toggled compared to the value in the previous transmission of this TB of this HARQ process; or
2> if the uplink grant was received on PDCCH for the C-RNTI and the HARQ buffer of the identified process is empty; or
2> if the uplink grant was received in a Random Access Response (i.e. in a MAC RAR or a fallback RAR); or
2> if the uplink grant was determined as specified in clause 5.1.2a for the transmission of the MSGA payload; or 2> if the uplink grant was received on PDCCH for the C-RNTI in ra-ResponseWindow and this PDCCH successfully completed the Random Access procedure initiated for beam failure recovery; or
2> if the uplink grant is part of a bundle of the configured uplink grant, and may be used for initial transmission according to clause 6.1.2.3 of TS 38.214 [7], and if no MAC PDU has been obtained for this bundle:
   3> if there is a MAC PDU in the MSGA buffer and the uplink grant determined as specified in clause 5.1.2a for the transmission of the MSGA payload was selected; or
   3> if there is a MAC PDU in the MSGA buffer and the uplink grant was received in a fallbackRAR and this fallbackRAR successfully completed the Random Access procedure:
      4> obtain the MAC PDU to transmit from the MSGA buffer.
   3> else if there is a MAC PDU in the Msg3 buffer and the uplink grant was received in a fallback-RAR:
      4> obtain the MAC PDU to transmit from the Msg3 buffer.
   3> else if there is a MAC PDU in the Msg3 buffer and the uplink grant was received in a MAC RAR; or:
   3> if there is a MAC PDU in the Msg3 buffer and the uplink grant was received on PDCCH for the C-RNTI in ra-ResponseWindow and this PDCCH successfully completed the Random Access procedure initiated for beam failure recovery:
      4> obtain the MAC PDU to transmit from the Msg3 buffer.
      4> if the uplink grant size does not match with size of the obtained MAC PDU; and
      4> if the Random Access procedure was successfully completed upon receiving the uplink grant:
         5> indicate to the Multiplexing and assembly entity to include MAC subPDU(s) carrying MAC SDU from the obtained MAC PDU in the subsequent uplink transmission;
         5> obtain the MAC PDU to transmit from the Multiplexing and assembly entity.
   3> else if this uplink grant is a configured grant configured with autonomousTx; and
   3> if the previous configured uplink grant, in the BWP, for this HARQ process was not prioritized; and
   3> if a MAC PDU had already been obtained for this HARQ process; and
   3> if the uplink grant size matches with size of the obtained MAC PDU; and
   3> if none of PUSCH transmission(s) of the obtained MAC PDU has been completely performed:
      4> consider the MAC PDU has been obtained.
   3> else if the MAC entity is not configured with lch-basedPrioritization; or
   3> if this uplink grant is a prioritized uplink grant:
      4> obtain the MAC PDU to transmit from the Multiplexing and assembly entity, if any;
   3> if a MAC PDU to transmit has been obtained:
      4> if the uplink grant is not a configured grant configured with autonomousTx; or
      4> if the uplink grant is a prioritized uplink grant:
         5> deliver the MAC PDU and the uplink grant and the HARQ information of the TB to the identified HARQ process;
         5> instruct the identified HARQ process to trigger a new transmission;
         5> if the uplink grant is a configured uplink grant:
            6> start or restart the configuredGrantTimer, if configured, for the corresponding HARQ process when the transmission is performed if LBT failure indication is not received from lower layers;
            6> start or restart the cg-RetransmissionTimer, if configured, for the corresponding HARQ process when the transmission is performed if LBT failure indication is not received from lower layers.
         5> if the uplink grant is addressed to C-RNTI, and the identified HARQ process is configured for a configured uplink grant:
            6> start or restart the configuredGrantTimer, if configured, for the corresponding HARQ process when the transmission is performed if LBT failure indication is not received from lower layers.
         5> if cg-RetransmissionTimer is configured for the identified HARQ process; and
         5> if the transmission is performed and LBT failure indication is received from lower layers:
            6> consider the identified HARQ process as pending.
   3> else:
      4> flush the HARQ buffer of the identified HARQ process.
2> else (i.e. retransmission):
   3> if the uplink grant received on PDCCH was addressed to CS-RNTI and if the HARQ buffer of the identified process is empty; or
   3> if the uplink grant is part of a bundle and if no MAC PDU has been obtained for this bundle; or
   3> if the uplink grant is part of a bundle of the configured uplink grant, and the PUSCH duration of the uplink grant overlaps with an uplink grant received in a Random Access Response (i.e. MAC RAR or fallbackRAR) or an uplink grant determined as specified in clause 5.1.2a for MSGA payload for this Serving Cell; or:
   3> if the MAC entity is not configured with lch-basedPrioritization and this uplink grant is part of a bundle of the configured uplink grant, and the PUSCH duration of the uplink grant overlaps with a PUSCH duration of another uplink grant received on the PDCCH; or:
   3> if the MAC entity is configured with lch-basedPrioritization and this uplink grant is not a prioritized uplink grant:
      4> ignore the uplink grant.
   3> else:
      4> deliver the uplink grant and the HARQ information (redundancy version) of the TB to the identified HARQ process;
      4> instruct the identified HARQ process to trigger a retransmission;
      4> if the uplink grant is addressed to CS-RNTI; or
      4> if the uplink grant is addressed to C-RNTI, and the identified HARQ process is configured for a configured uplink grant:

5> start or restart the configuredGrantTimer, if configured, for the corresponding HARQ process when the transmission is performed if LBT failure indication is not received from lower layers.
4> if the uplink grant is a configured uplink grant:
5> if the identified HARQ process is pending:
6> start or restart the configuredGrantTimer, if configured, for the corresponding HARQ process when the transmission is performed if LBT failure indication is not received from lower layers;
5> start or restart the cg-RetransmissionTimer, if configured, for the corresponding HARQ process when the transmission is performed if LBT failure indication is not received from lower layers.
4> if the identified HARQ process is pending and the transmission is performed and LBT failure indication is not received from lower layers:
5> consider the identified HARQ process as not pending.

When determining if NDI has been toggled compared to the value in the previous transmission the MAC entity shall ignore NDI received in all uplink grants on PDCCH for its Temporary C-RNTI.

When configuredGrantTimer or cg-RetransmissionTimer is started or restarted by a PUSCH transmission, it shall be started at the beginning of the first symbol of the PUSCH transmission.

5.4.2.2 HARQ Process

Each HARQ process is associated with a HARQ buffer.

New transmissions are performed on the resource and with the MCS indicated on PDCCH or indicated in the Random Access Response (i.e. MAC RAR or fallbackRAR), or signalled in RRC or determined as specified in clause 5.1.2a for MSGA payload. Retransmissions are performed on the resource and, if provided, with the MCS indicated on PDCCH, or on the same resource and with the same MCS as was used for last made transmission attempt within a bundle, or on stored configured uplink grant resources and stored MCS when cg-RetransmissionTimer is configured. If cg-RetransmissionTimer is configured, retransmissions with the same HARQ process may be performed on any configured grant configuration if the configured grant configurations have the same TBS.

When cg-RetransmissionTimer is configured and the HARQ entity obtains a MAC PDU to transmit and LBT failure indication is received from lower layer, the corresponding HARQ process is considered to be pending. For a configured uplink grant, configured with cg-RetransmissionTimer, each associated HARQ process is considered as not pending when:

a transmission is performed on that HARQ process and LBT failure indication is not received from lower layers;

or the configured uplink grant is initialised and this HARQ process is not associated with another active configured uplink grant; or the HARQ buffer for this HARQ process is flushed.

If the HARQ entity requests a new transmission for a TB, the HARQ process shall:
1> store the MAC PDU in the associated HARQ buffer;
1> store the uplink grant received from the HARQ entity;
1> generate a transmission as described below.

If the HARQ entity requests a retransmission for a TB, the HARQ process shall:
1> store the uplink grant received from the HARQ entity;
1> generate a transmission as described below.

To generate a transmission for a TB, the HARQ process shall:
1> if the MAC PDU was obtained from the Msg3 buffer; or
1> if the MAC PDU was obtained from the MSGA buffer; or
1> if there is no measurement gap at the time of the transmission and, in case of retransmission, the retransmission does not collide with a transmission for a MAC PDU obtained from the Msg3 buffer or the MSGA buffer:
2> if there are neither transmission of $N_R$ sidelink communication nor transmission of V2X sidelink communication at the time of the transmission; or
2> if the transmission of the MAC PDU is prioritized over sidelink transmission or can be simultaneously performed with sidelink transmission:
3> instruct the physical layer to generate a transmission according to the stored uplink grant.

If a HARQ process receives downlink feedback information, the HARQ process shall:
1> stop the cg-RetransmissionTimer, if running;
1> if acknowledgement is indicated:
2> stop the configuredGrantTimer, if running.

If the configuredGrantTimer expires for a HARQ process, the HARQ process shall:
1> stop the cg-RetransmissionTimer, if running.

The transmission of the MAC PDU is prioritized over sidelink transmission or can be performed simultaneously with sidelink transmission if one of the following conditions is met:

if there are both a sidelink grant for transmission of $N_R$ sidelink communication and a configured grant for transmission of V2X sidelink communication on SL-SCH as described in clause 5.14.1.2.2 of TS 36.321 [22] at the time of the transmission, and neither the transmission of $N_R$ sidelink communication is prioritized as described in clause 5.22.1.3.1a nor the transmissions of V2X sidelink communication is prioritized as described in clause 5.14.1.2.2 of TS 36.321 [22]; or if there are both a sidelink grant for transmission of $N_R$ sidelink communication and a configured grant for transmission of V2X sidelink communication on SL-SCH as described in clause 5.14.1.2.2 of TS 36.321 [22] at the time of the transmission, and the MAC PDU includes any MAC CE prioritized as described in clause 5.4.3.1.3 or the value of the highest priority of the logical channel(s) in the MAC PDU is lower than ul-PrioritizationThres if ul-PrioritizationThres is configured; or if there are both a sidelink grant for transmission of $N_R$ sidelink communication and a configured grant for transmission of V2X sidelink communication on SL-SCH as described in clause 5.14.1.2.2 of TS 36.321 [22] at the time of the transmission, and the MAC entity is able to perform this UL transmission simultaneously with the transmission of $N_R$ sidelink communication and/or the transmissions of V2X sidelink communication; or if there is only configured grant(s) for transmission of V2X sidelink communication on SL-SCH as described in clause 5.14.1.2.2 of TS 36.321 [22] at the time of the transmission, and either none of the transmissions of V2X sidelink communication is prioritized as described in clause 5.14.1.2.2 of TS 36.321 [22] or the MAC entity is able to perform this UL transmission simultaneously with the transmissions of V2X sidelink communication; or
- if there is only a sidelink grant for transmission of $N_R$ sidelink communication at the time of the transmission, and if the MAC PDU includes any MAC CE prioritized as described in clause 5.4.3.1.3, or the transmission of $N_R$ sidelink communication is not prioritized as described in clause 5.22.1.3.1a, or the value of the highest priority of the logical channel(s) in the MAC PDU is lower than ul-PrioritizationThres if ul-PrioritizationThres is configured, or there is a sidelink grant for transmission of $N_R$ sidelink communication at the time of the transmission and the MAC entity is able to perform this UL transmission simultaneously with the transmission of $N_R$ sidelink communication; or
- if there are both a sidelink grant for transmission of $N_R$ sidelink communication and a configured grant for transmission of V2X sidelink communication on SL-SCH as described in clause 5.14.1.2.2 of TS 36.321 [22] at the time of the transmission, and either only the transmission of $N_R$ sidelink communication is prioritized as described in clause 5.22.1.3.1a or only the transmissions of V2X sidelink communication is prioritized as described in clause 5.14.1.2.2 of TS 36.321 [22] and the MAC entity is able to perform this UL transmission simultaneously with the prioritized transmission of $N_R$ sidelink communication or V2X sidelink communication:

NOTE 1: Among the UL transmissions where the MAC entity is able to perform the transmission of $N_R$ sidelink communication prioritized simultaneously, if there are more than one UL transmission which the MAC entity is not able to perform simultaneously, it is up to UE implementation whether this UL transmission is performed.

NOTE 2: Among the UL transmissions that the MAC entity is able to perform simultaneously with all transmissions of V2X sidelink communication prioritized, if there are more than one UL transmission which the MAC entity is not able to perform simultaneously, it is up to UE implementation whether this UL transmission is performed.

NOTE 3: Among the UL transmissions where the MAC entity is able to perform the transmission of $N_R$ sidelink communication prioritized simultaneously with all transmissions of V2X sidelink communication prioritized, if there are more than one UL transmission which the MAC entity is not able to perform simultaneously, it is up to UE implementation whether this UL transmission is performed.

NOTE 4: If there is a configured grant for transmission of V2X sidelink communication on SL-SCH as described in clause 5.14.1.2.2 of TS 36.321 [22] at the time of the transmission, and the MAC entity is not able to perform this UL transmission simultaneously with the transmission of V2X sidelink communication, and prioritization-related information is not available prior to the time of the transmission due to processing time restriction, it is up to UE implementation whether this UL transmission is performed.

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:
- drx-onDurationTimer: the duration at the beginning of a DRX cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
- ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When DRX is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant and LBT failure indication is not received from lower layers:
  2> start the drx-HARQ-RTT-TimerUL for the corresponding HARQ process in the first symbol after the end of the first transmission (within a bundle) of the corresponding PUSCH transmission;
  2> stop the drx-RetransmissionTimerUL for the corresponding HARQ process at the first transmission (within a bundle) of the corresponding PUSCH transmission.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer for each DRX group;
  2> stop drx-InactivityTimer for each DRX group.
1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.
1> if a DRX Command MAC CE is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2> else:
    3> use the Long DRX cycle for each DRX group.
1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.
1> if the Short DRX cycle is used for a DRX group, and [(SFN×10)+subframe number] modulo (drx-ShortCycle)=(drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN×10)+subframe number] modulo (drx-LongCycle)=drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2> else:
    3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.

1> if a DRX group is in Active Time:
  2> monitor the PDCCH on the Serving Cells in this DRX group as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;

NOTE 3: When HARQ feedback is postponed by PDSCH-to-HARQ_feedback timing indicating a non-numerical kl value, as specified in TS 38.213 [6], the corresponding transmission opportunity to send the DL HARQ feedback is indicated in a later PDCCH requesting the HARQ-ACK feedback.

3> stop the drx-RetransmissionTimerDL for the corresponding HARQ process.
    3> if the PDSCH-to-HARQ_feedback timing indicate a non-numerical kl value as specified in TS 38.213 [6]:
      4> start the drx-RetransmissionTimerDL in the first symbol after the (end of the last) PDSCH transmission (within a bundle) for the corresponding HARQ process.
2> if the PDCCH indicates a UL transmission:
3> start the drx-HARQ-RTT-TimerUL for the corresponding HARQ process in the first symbol after the end of the first transmission (within a bundle) of the corresponding PUSCH transmission;
3> stop the drx-RetransmissionTimerUL for the corresponding HARQ process.
2> if the PDCCH indicates a new transmission (DL or UL) on a Serving Cell in this DRX group:
3> start or restart drx-InactivityTimer for this DRX group in the first symbol after the end of the PDCCH reception.
NOTE 3a: A PDCCH indicating activation of SPS or configured grant type 2 is considered to indicate a new transmission.
2> if a HARQ process receives downlink feedback information and acknowledgement is indicated:
3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
3> not transmit periodic SRS and semi-persistent SRS defined in TS 38.214 [7];
3> not report semi-persistent CSI configured on PUSCH;
3> if ps-TransmitPeriodicL1-RSRP is not configured with value true:
4> not report periodic CSI that is L1-RSRP on PUCCH.
3> if ps-TransmitOtherPeriodicCSI is not configured with value true:
4> not report periodic CSI that is not L1-RSRP on PUCCH.
1> else:
2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
3> not transmit periodic SRS and semi-persistent SRS defined in TS 38.214 [7] in this DRX group;
3> not report CSI on PUCCH and semi-persistent CSI configured on PUSCH in this DRX group.
2> if CSI masking (csi-Mask) is setup by upper layers:
3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
4> not report CSI on PUCCH in this DRX group.

NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource either outside DRX Active Time of the DRX group in which this PUCCH is configured or outside the on-duration period of the DRX group in which this PUCCH is configured if CSI masking is setup by upper layers, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

5.22 SL-SCH Data Transfer
5.22.1 SL-SCH Data Transmission
5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1 as indicated in TS 38.331 [5], the MAC entity shall for each PDCCH occasion and for each grant received for this PDCCH occasion:
1> if a sidelink grant has been received on the PDCCH for the MAC entity's SL-RNTI:
2> if the NDI received on the PDCCH has not been toggled compared to the value in the previously received HARQ information for the HARQ Process ID:
3> use the received sidelink grant to determine PSCCH duration(s) and PSSCH duration(s) for one or more retransmissions of a single MAC PDU for the corresponding Sidelink process according to clause 8.1.2 of TS 38.214 [7].
2> else:
3> use the received sidelink grant to determine PSCCH duration(s) and PSSCH duration(s) for initial transmission and, if available, retransmission(s) of a single MAC PDU according to clause 8.1.2 of TS 38.214 [7].
2> if a sidelink grant is available for retransmission(s) of a MAC PDU which has been positively acknowledged as specified in clause 5.22.1.3.1a:
3> clear the PSCCH duration(s) and PSSCH duration(s) corresponding to retransmission(s) of the MAC PDU from the sidelink grant.
1> else if a sidelink grant has been received on the PDCCH for the MAC entity's SLCS-RNTI:
2> if PDCCH contents indicate retransmission(s) for the identifed HARQ process ID that has been set for an activated configured sidelink grant identified by sl-ConfigIndexCG:
3> use the received sidelink grant to determine PSCCH duration(s) and PSSCH duration(s) for one or more retransmissions of a single MAC PDU according to clause 8.1.2 of TS 38.214 [7].
2> else if PDCCH contents indicate configured grant Type 2 deactivation for a configured sidelink grant:
  3> trigger configured sidelink grant confirmation for the configured sidelink grant.
2> else if PDCCH contents indicate configured grant Type 2 activation for a configured sidelink grant:
  3> trigger configured sidelink grant confirmation for the configured sidelink grant;
  3> store the configured sidelink grant;
  3> initialise or re-initialise the configured sidelink grant to determine the set of PSCCH durations and the set of PSSCH durations for transmissions of multiple MAC PDUs according to clause 8.1.2 of TS 38.214 [7].

If the MAC entity has been configured with Sidelink resource allocation mode 2 to transmit using pool(s) of resources in a carrier as indicated in TS 38.331 [5] or TS 36.331 [21] based on sensing or random selection, the MAC entity shall for each Sidelink process:
  NOTE 1: If the MAC entity is configured with Sidelink resource allocation mode 2 to transmit using a pool of resources in a carrier as indicated in TS 38.331 [5] or TS 36.331 [21], the MAC entity can create a selected sidelink grant on the pool of resources based on random selection or sensing only after releasing configured sidelink grant(s), if any.
  NOTE 2: The MAC entity expects that PSFCH is always configured by RRC for at least one pool of resources in sl-TxPoolSelectedNormal and for the resource pool in sl-TxPoolExceptional in case that at least a logical channel configured with sl-HARQ-FeedbackEnabled is set to enabled.
  1> if the MAC entity has selected to create a selected sidelink grant corresponding to transmissions of multiple MAC PDUs, and SL data is available in a logical channel:
    2> if the MAC entity has not selected a pool of resources allowed for the logical channel:
      3> if sl-HARQ-FeedbackEnabled is set to enabled for the logical channel:
        4> select any pool of resources configured with PSFCH resources among the pools of resources;
      3> else:
        4> select any pool of resources among the pools of resources;
    2> perform the TX resource (re-)selection check on the selected pool of resources as specified in clause 5.22.1.2;
  NOTE 3: The MAC entity continuously performs the TX resource (re-)selection check until the corresponding pool of resources is released by RRC or the MAC entity decides to cancel creating a selected sidelink grant corresponding to transmissions of multiple MAC PDUs.
    2> if the TX resource (re-)selection is triggered as the result of the TX resource (re-)selection check:
      3> select one of the allowed values configured by RRC in sl-ResourceReservePeriodList and set the resource reservation interval, $P_{rsvp\_TX}$, with the selected value;
  NOTE 3A: The MAC entity selects a value for the resource reservation interval which is larger than the remaining PDB of SL data available in the logical channel.
      3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;
      3> select the number of HARQ retransmissions from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
      3> select an amount of frequency resources within the range, if configured by RRC, between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
      3> if transmission based on random selection is configured by upper layers:
        4> randomly select the time and frequency resources for one transmission opportunity from the resources pool, according to the amount of selected frequency resources and the remaining PDB of SL data available in the logical channel(s) allowed on the carrier.
      3> else:
        4> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier.
      3> use the randomly selected resource to select a set of periodic resources spaced by the resource reservation interval for transmissions of PSCCH and PSSCH corresponding to the number of transmission opportunities of MAC PDUs determined in TS 38.214 [7];
      3> if one or more HARQ retransmissions are selected:
        4> if transmission based on sensing is configured by upper layers and there are available resources left in the resources indicated by the physical layer according to clause 8.1.4 of TS 38.214 [7] for more transmission opportunities; or 4> if transmission based on random selection is configured by upper layers and there are available resources left in the resource pool for more transmission opportunities:

5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9];

5> use the randomly selected resource to select a set of periodic resources spaced by the resource reservation interval for transmissions of PSCCH and PSSCH corresponding to the number of retransmission opportunities of the MAC PDUs determined in TS 38.214 [7];

5> consider the first set of transmission opportunities as the initial transmission opportunities and the other set(s) of transmission opportunities as the retransmission opportunities;

5> consider the sets of initial transmission opportunities and retransmission opportunities as the selected sidelink grant.

3> else:

4> consider the set as the selected sidelink grant.

3> use the selected sidelink grant to determine the set of PSCCH durations and the set of PSSCH durations according to TS 38.214 [7].

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by RRC in sl-ProbResourceKeep:

3> clear the selected sidelink grant, if available;

3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;

3> reuse the previously selected sidelink grant for the number of transmissions of the MAC PDUs determined in TS 38.214 [7] with the resource reservation interval to determine the set of PSCCH durations and the set of PSSCH durations according to TS 38.214 [7].

1> if the MAC entity has selected to create a selected sidelink grant corresponding to transmission(s) of a single MAC PDU, and if SL data is available in a logical channel, or a SL-CSI reporting is triggered:

2> if SL data is available in the logical channel:

3> if sl-HARQ-FeedbackEnabled is set to enabled for the logical channel:

4> select any pool of resources configured with PSFCH resources among the pools of resources;

3> else:

4> select any pool of resources among the pools of resources;

2> else if a SL-CSI reporting is triggered:

3> select any pool of resources among the pools of resources.

2> perform the TX resource (re-)selection check on the selected pool of resources as specified in clause 5.22.1.2; 2> if the TX resource (re-)selection is triggered as the result of the TX resource (re-) selection check:

3> select the number of HARQ retransmissions from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> select an amount of frequency resources within the range, if configured by RRC, between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> if transmission based on random selection is configured by upper layers:

4> randomly select the time and frequency resources for one transmission opportunity from the resources pool, according to the amount of selected frequency resources and the remaining PDB of SL data available in the logical channel(s) allowed on the carrier, and the latency requirement of the triggered SL CSI reporting;

3> else:

4> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier, and/or the latency requirement of the triggered SL-CSI reporting;
   3> if one or more HARQ retransmissions are selected:
      4> if transmission based on sensing is configured by upper layers and there are available resources left in the resources indicated by the physical layer according to clause 8.1.4 of TS 38.214 [7] for more transmission opportunities; or
      4> if transmission based on random selection is configured by upper layers and there are available resources left in the resources pool for more transmission opportunities:
         5> randomly select the time and frequency resources for one or more transmission opportunities from the available resources, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];
         5> consider a transmission opportunity which comes first in time as the initial transmission opportunity and other transmission opportunities as the retransmission opportunities;
         5> consider all the transmission opportunities as the selected sidelink grant;
   3> else:
      4> consider the set as the selected sidelink grant;
   3> use the selected sidelink grant to determine PSCCH duration(s) and PSSCH duration(s) according to TS 38.214 [7].

NOTE 3B: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.

1> if a selected sidelink grant is available for retransmission(s) of a MAC PDU which has been positively acknowledged as specified in clause 5.22.1.3.3:
   2> clear the PSCCH duration(s) and PSSCH duration(s) corresponding to retransmission(s) of the MAC PDU from the selected sidelink grant.

NOTE 3C: How the MAC entity determines the remaining PDB of SL data is left to UE implementation.

For a selected sidelink grant, the minimum time gap between any two selected resources comprises:
   a time gap between the end of the last symbol of a PSSCH transmission of the first resource and the start of the first symbol of the corresponding PSFCH reception determined by sl-MinTimeGapPSFCH and sl-PSFCH-Period for the pool of resources; and
   a time required for PSFCH reception and processing plus sidelink retransmission preparation including multiplexing of necessary physical channels and any TX-RX/RX-TX switching time.

NOTE: How to determine the time required for PSFCH reception and processing plus sidelink retransmission preparation is left to UE implementation.

The MAC entity shall for each PSSCH duration:
1> for each sidelink grant occurring in this PSSCH duration:
   2> select a MCS table allowed in the pool of resource which is associated with the sidelink grant;

NOTE 4a: MCS table selection is up to UE implementation if more than one MCS table is configured.

2> if the MAC entity has been configured with Sidelink resource allocation mode 1:
      3> select a MCS which is, if configured, within the range that is configured by RRC between sl-MinMCS-PSSCH and sl-MaxMCS-PSSCH associated with the selected MCS table included in sl-ConfigDedicatedNR;
      3> set the resource reservation interval to 0 ms.
   2> else:
      3> select a MCS which is, if configured, within the range, if configured by RRC, between sl-MinMCS-PSSCH and sl-MaxMCS-PSSCH associated with the selected MCS table included in sl-PSSCH-TxConfigList and, if configured by RRC, overlapped between sl-MinMCS-PSSCH and sl-MaxMCS-PSSCH associated with the selected MCS table indicated in sl-CBR-PriorityTxConfigList for the highest priority of the sidelink logical channel(s) in the MAC PDU and the CBR measured by lower layers according to clause 5.1.27 of TS 38.215 [24] if CBR measurement results are available or the corresponding sl-defaultTxConfigIndex configured by RRC if CBR measurement results are not available;
      3> if the MAC entity decides not to use the selected sidelink grant for the next PSSCH duration corresponding to an initial transmission opportunity:
         4> set the resource reservation interval to 0 ms.
      3> else:
         4> set the resource reservation interval to the selected value.

NOTE 5: MCS selection is up to UE implementation if the MCS or the corresponding range is not configured by RRC.

2> if the configured sidelink grant has been activated and this PSSCH duration corresponds to the first PSSCH transmission opportunity within this sl-PeriodCG of the configured sidelink grant:
      3> set the HARQ Process ID to the HARQ Process ID associated with this PSSCH duration and, if available, all subsequent PSSCH duration(s) occurring in this sl-PeriodCG for the configured sidelink grant;
      3> determine that this PSSCH duration is used for initial transmission;
      3> flush the HARQ buffer of Sidelink process associated with the HARQ Process ID.
   2> deliver the sidelink grant, the selected MCS, and the associated HARQ information to the Sidelink HARQ Entity for this PSSCH duration.

For configured sidelink grants, the HARQ Process ID associated with the first slot of a SL transmission is derived from the following equation:

HARQ Process ID=[floor(CURRENT_slot/Periodici-
tySL)]modulo sl-NrOfHARQ-Processes+sl-
HARQ-ProcID-offset where CURRENT_slot refers to current logical slot in the associated resource pool, and PeriodicitySL is defined in clause 5.8.3.

5.22.1.2 TX Resource (Re-)Selection Check

If the TX resource (re-)selection check procedure is triggered on the selected pool of resources for a Sidelink process according to clause 5.22.1.1, the MAC entity shall for the Sidelink process:

1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by RRC in sl-ProbResourceKeep; or 1> if the pool of resources is configured or reconfigured by RRC; or 1> if there is no selected sidelink grant on the selected pool of resources; or 1> if neither transmission nor retransmission has been performed by the MAC entity on any resource indicated in the selected sidelink grant during the last second; or 1> if sl-ReselectAfter is configured and the number of consecutive unused transmission opportunities on resources indicated in the selected sidelink grant, which is incremented by 1 when none of the resources of the selected sidelink grant within a resource reservation interval is used, is equal to sl-ReselectAfter; or 1> if the selected sidelink grant cannot accommodate a RLC SDU by using the maximum allowed MCS configured by RRC in sl-MaxMCS-PSSCH associated with the selected MCS table and the UE selects not to segment the RLC SDU; or NOTE 1: If the selected sidelink grant cannot accommodate the RLC SDU, it is left for UE implementation whether to perform segmentation or sidelink resource reselection.

1> if transmission(s) with the selected sidelink grant cannot fulfil the remaining PDB of the data in a logical channel according to the associated priority, and the MAC entity selects not to perform transmission(s) corresponding to a single MAC PDU:

NOTE 2: If the remaining PDB is not met, it is left for UE implementation whether to perform transmission(s) corresponding to single MAC PDU or sidelink resource reselection.

NOTE 3: It is left for UE implementation whether to trigger the TX resource (re-)selection due to the latency requirement of the MAC CE triggered according to clause 5.22.1.7.

2> clear the selected sidelink grant associated to the Sidelink process, if available;

2> trigger the TX resource (re-)selection.

NOTE 4: Void.

NOTE 5: Void.

5.22.1.2a Re-evaluation and Pre-emption

A resource(s) of the selected sidelink grant for a MAC PDU to transmit from multiplexing and assembly entity is re-evaluated by physical layer at $T_3$ before the slot where the SCI indicating the resource(s) is signalled at first time as specified in clause 8.1.4 of TS 38.214 [7].

A resource(s) of the selected sidelink grant which has been indicated by a prior SCI for a MAC PDU to transmit from multiplexing and assembly entity could be checked for pre-emption by physical layer at $T_3$ before the slot where the resource(s) is located as specified in clause 8.1.4 of TS 38.214 [7].

NOTE 1: It is up to UE implementation to re-evaluate or pre-empt before 'm−$T_3$' or after 'm−$T_3$' but before 'm'. For re-evaluation, m is the slot where the SCI indicating the resource(s) is signalled at first time as specified in clause 8.1.4 of TS 38.214. For pre-emption, m is the slot where the resource(s) is located as specified in clause 8.1.4 of TS 38.214.

If the MAC entity has been configured with Sidelink resource allocation mode 2 to transmit using pool(s) of resources in a carrier as indicated in TS 38.331 [5] or TS 36.331 [21] based on sensing or random selection the MAC entity shall for each Sidelink process:

1> if a resource(s) of the selected sidelink grant which has not been identified by a prior SCI is indicated for re-evaluation by the physical layer as specified in clause 8.1.4 of TS 38.214 [7]; or 1> if any resource(s) of the selected sidelink grant which has been indicated by a prior SCI is indicated for pre-emption by the physical layer as specified in clause 8.1.4 of TS 38.214 [7]:

2> remove the resource(s) from the selected sidelink grant associated to the Sidelink process;

2> randomly select the time and frequency resource from the resources indicated by the physical layer as specified in clause 8.1.4 of TS 38.214 [7] for either the removed resource or the dropped resource, according to the amount of selected frequency resources, the selected number of HARQ retransmissions and the remaining PDB of either SL data available in the logical channel(s) by ensuring the minimum time gap between any two selected resources of the selected sidelink grant in case that PSFCH is configured for this pool of resources, and that a resource can be indicated by the time resource assignment of a SCI for a retransmission according to clause 8.3.1.1 of TS 38.212 [9];

NOTE 2: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.

2> replace the removed or dropped resource(s) by the selected resource(s) for the selected sidelink grant.

NOTE 3: It is left for UE implementation to reselect any pre-selected but not reserved resource(s) other than the resource(s) indicated for pre-emption or re-evaluation by the physical layer during reselection triggered by re-evaluation or pre-emption indicated by the physical layer.

NOTE 4: It is up to UE implementation whether to set the resource reservation interval in the re-selected resource to replace pre-empted resource.

NOTE 5: It is up to UE implementation whether to trigger resource reselection due to deprioritization as specified in clause 16.2.4 of TS 38.213 [6], clause 5.14.1.2.2 of TS 36.321 [22] and clause 5.22.1.3.1a.

NOTE 6: For the selected sidelink grant corresponds to transmissions of multiple MAC PDU, it is up to UE implementation whether to apply re-evaluation check to the resources in non-initial reservation period that have been signalled neither in the immediate last nor in the current period.

5.22.1.3 Sidelink HARQ Operation 5.22.1.3.1 Sidelink HARQ Entity

The MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

For each sidelink grant, the Sidelink HARQ Entity shall:
  1> if the MAC entity determines that the sidelink grant is used for initial transmission as specified in clause 5.22.1.1; or
  1> if the sidelink grant is a configured sidelink grant and no MAC PDU has been obtained in a sl-PeriodCG of the configured sidelink grant:
  NOTE 1: Void.
    2> (re-)associate a Sidelink process to this grant, and for the associated Sidelink process:
    NOTE 1A: The Sidelink HARQ Entity will associate the selected sidelink grant to the Sidelink process determined by the MAC entity.
      3> obtain the MAC PDU to transmit from the Multiplexing and assembly entity, if any;
      3> if a MAC PDU to transmit has been obtained:
        4> if a HARQ Process ID has been set for the sidelink grant:
          5> (re-)associate the HARQ Process ID corresponding to the sidelink grant to the Sidelink process;
      NOTE 1a: There is one-to-one mapping between a HARQ Process ID and a Sidelink process in the MAC entity configured with Sidelink resource allocation mode 1.
        4> determines Sidelink transmission information of the TB for the source and destination pair of the MAC PDU as follows:
          5> set the Source Layer-1 ID to the 8 LSB of the Source Layer-2 ID of the MAC PDU;
          5> set the Destination Layer-1 ID to the 16 LSB of the Destination Layer-2 ID of the MAC PDU;
          5> (re-)associate the Sidelink process to a Sidelink process ID;
        NOTE 1b: How UE determine Sidelink process ID in SCI is left to UE implementation for $N_R$ sidelink.
          5> consider the NDI to have been toggled compared to the value of the previous transmission corresponding to the Sidelink identification information and the Sidelink process ID of the MAC PDU and set the NDI to the toggled value;
        NOTE 2: The initial value of the NDI set to the very first transmission for the associated Sidelink process is left to UE implementation.
        NOTE 3: Void.
          5> set the cast type indicator to one of broadcast, groupcast and unicast as indicated by upper layers;
          5> if HARQ feedback has been enabled for the MAC PDU according to clause 5.22.1.4.2;
            6> set the HARQ feedback enabled/disabled indicator to enabled.
          5> else:
            6> set the HARQ feedback enabled/disabled indicator to disabled.
          5> set the priority to the value of the highest priority of the logical channel(s), if any, and a MAC CE, if included, in the MAC PDU;
          5> if HARQ feedback is enabled for groupcast:
            6> if both a group size and a member ID are provided by upper layers and the group size is not greater than the number of candidate PSFCH resources associated with this sidelink grant:
              7> select either positive-negative acknowledgement or negative-only acknowledgement.
            NOTE 4: Selection of positive-negative acknowledgement or negative-only acknowledgement is up to UE implementation.
            5> set the Redundancy version to the selected value.
            6> else:
              7> select negative-only acknowledgement.
            6> if negative-only acknowledgement is selected, UE's location information is available, and sl-TransRange has been configured for a logical channel in the MAC PDU, and sl-ZoneConfig is configured as specified in TS 38.331 [5]:
              7> set the communication range requirement to the value of the longest communication range of the logical channel(s) in the MAC PDU;
              7> determine the value of sl-ZoneLength corresponding to the communication range requirement and set Zone_id to the value of Zone_id calculated using the determined value of sl-ZoneLength as specified in TS 38.331 [5].
          4> deliver the MAC PDU, the sidelink grant and the Sidelink transmission information of the TB to the associated Sidelink process;
          4> instruct the associated Sidelink process to trigger a new transmission.
      3> else:
        4> flush the HARQ buffer of the associated Sidelink process.
  1> else (i.e. retransmission):
    2> if the HARQ Process ID corresponding to the sidelink grant received on PDCCH, the configured sidelink grant or the selected sidelink grant is associated to a Sidelink process of which HARQ buffer is empty; or
    2> if the HARQ Process ID corresponding to the sidelink grant received on PDCCH is not associated to any Sidelink process:
      3> ignore the sidelink grant.
    2> else:
      3> identify the Sidelink process associated with this grant, and for the associated Sidelink process:
        4> deliver the sidelink grant of the MAC PDU to the associated Sidelink process;
        4> instruct the associated Sidelink process to trigger a retransmission.

5.22.1.3.1a Sidelink Process

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU is determined by the highest priority of the logical channel(s) or a MAC CE in the MAC PDU.

If the Sidelink HARQ Entity requests a new transmission, the Sidelink process shall:
- 1> store the MAC PDU in the associated HARQ buffer;
- 1> store the sidelink grant received from the Sidelink HARQ Entity;
- 1> generate a transmission as described below.

If the Sidelink HARQ Entity requests a retransmission, the Sidelink process shall:
- 1> store the sidelink grant received from the Sidelink HARQ Entity;
- 1> generate a transmission as described below.

To generate a transmission, the Sidelink process shall:
- 1> if there is no uplink transmission; or
- 1> if the MAC entity is able to simultaneously perform uplink transmission(s) and sidelink transmission at the time of the transmission; or
- 1> if the other MAC entity and the MAC entity are able to simultaneously perform uplink transmission(s) and sidelink transmission at the time of the transmission respectively; or
- 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
    - 2> instruct the physical layer to transmit SCI according to the stored sidelink grant with the associated Sidelink transmission information;
    - 2> instruct the physical layer to generate a transmission according to the stored sidelink grant;
    - 2> if HARQ feedback has been enabled the MAC PDU according to clause 5.22.1.4.2:
        - 3> instruct the physical layer to monitor PSFCH for the transmission and perform PSFCH reception as specified in clause 5.22.1.3.2.
    - 2> if sl-PUCCH-Config is configured by RRC for the stored sidelink grant:
        - 3> determine transmission of an acknowledgement on the PUCCH as specified in clause 5.22.1.3.2.
- 1> if this transmission corresponds to the last transmission of the MAC PDU:
    - 2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU for Sidelink resource allocation mode 2. How to determine the last transmission in other cases is up to UE implementation.

- 1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or
- 1> if a positive acknowledgement to this transmission of the MAC PDU was received according to clause 5.22.1.3.2; or
- 1> if negative-only acknowledgement was enabled in the SCI and no negative acknowledgement was received for this transmission of the MAC PDU according to clause 5.22.1.3.2:
    - 2> flush the HARQ buffer of the associated Sidelink process.

The transmission of the MAC PDU is prioritized over uplink transmissions of the MAC entity or the other MAC entity if the following conditions are met:
- 1> if the MAC entity is not able to perform this sidelink transmission simultaneously with all uplink transmissions at the time of the transmission, and
- 1> if uplink transmission is neither prioritized as specified in clause 5.4.2.2 nor prioritized by upper layer according to TS 23.287 [19]; and
- 1> if sl-PrioritizationThres is configured and if the value of the highest priority of logical channel(s) or a MAC CE in the MAC PDU is lower than sl-PrioritizationThres.

NOTE 2: If the MAC entity is not able to perform this sidelink transmission simultaneously with all uplink transmissions as specified in clause 5.4.2.2 of TS 36.321 [22] at the time of the transmission, and prioritization-related information is not available prior to the time of this sidelink transmission due to processing time restriction, it is up to UE implementation whether this sidelink transmission is performed.

5.22.1.3.2 PSFCH Reception

The MAC entity shall for each PSSCH transmission:
- 1> if an acknowledgement corresponding to the PSSCH transmission in clause 5.22.1.3.1a is obtained from the physical layer:
    - 2> deliver the acknowledgement to the corresponding Sidelink HARQ entity for the Sidelink process;
- 1> else:
    - 2> deliver a negative acknowledgement to the corresponding Sidelink HARQ entity for the Sidelink process;
- 1> if the PSSCH transmission occurs for a pair of Source Layer-2 ID and Destination Layer-2 ID corresponding to a PC5-RRC connection which has been established by upper layers:
    - 2> perform the HARQ-Based Sidelink RLF Detection procedure as specified in clause 5.22.1.3.3.

If sl-PUCCH-Config is configured by RRC, the MAC entity shall for a PUCCH transmission occasion:
- 1> if the timeAlignmentTimer, associated with the TAG containing the Serving Cell on which the HARQ feedback is to be transmitted, is stopped or expired:
    - 2> not instruct the physical layer to generate acknowledgement(s) of the data in this TB.
- 1> else if a MAC PDU has been obtained for a sidelink grant associated to the PUCCH transmission occasion in clause 5.22.1.3.1, the MAC entity shall:
    - 2> if the most recent transmission of the MAC PDU was not prioritized as specified in clause 5.22.1.3.1a:

3> instruct the physical layer to signal a negative acknowledgement on the PUCCH according to clause 16.5 of TS 38.213 [6].
2> else if HARQ feedback has been disabled for the MAC PDU and next retransmission(s) of the MAC PDU is not required:
3> instruct the physical layer to signal a positive acknowledgement corresponding to the transmission on the PUCCH according to clause 16.5 of TS 38.213 [6].
2> else if HARQ feedback has been disabled for the MAC PDU and no sidelink grant is available for next retransmission(s) of the MAC PDU (including if HARQ feedback has been disabled for the MAC PDU and sl-MaxTransNum corresponding to the highest priority of the logical channel(s) in the MAC PDU has been configured in sl-CG-MaxTransNum-List for the sidelink grant by RRC and the number of transmissions of the MAC PDU has not reached sl-MaxTransNum after all PSSCH duration(s) in a sl-PeriodCG for the sidelink grant), if any:
3> instruct the physical layer to signal a negative acknowledgement corresponding to the transmission on the PUCCH according to clause 16.5 of TS 38.213 [6].
2> else:
3> instruct the physical layer to signal an acknowledgement corresponding to the transmission on the PUCCH according to clause 16.5 of TS 38.213 [6]
1> else:
2> instruct the physical layer to signal a positive acknowledgement on the PUCCH according to clause 16.5 of TS 38.213 [6].

5.22.1.3.3 HARQ-Based Sidelink RLF Detection

The HARQ-based Sidelink RLF detection procedure is used to detect Sidelink RLF based on a number of consecutive DTX on PSFCH reception occasions for a PC5-RRC connection.
RRC configures the following parameter to control HARQ-based Sidelink RLF detection:
  sl-maxNumConsecutiveDTX.
The following UE variable is used for HARQ-based Sidelink RLF detection.
  numConsecutiveDTX, which is maintained for each PC5-RRC connection.
The Sidelink HARQ Entity shall (re-)initialize numConsecutiveDTX to zero for each PC5-RRC connection which has been established by upper layers, if any, upon establishment of the PC5-RRC connection or (re)configuration of sl-maxNumConsecutiveDTX.
The Sidelink HARQ Entity shall for each PSFCH reception occasion associated to the PSSCH transmission:
1> if PSFCH reception is absent on the PSFCH reception occasion:
2> increment numConsecutiveDTX by 1;
2> if numConsecutiveDTX reaches sl-maxNumConsecutiveDTX:
3> indicate HARQ-based Sidelink RLF detection to RRC.
1> else:
2> re-initialize numConsecutiveDTX to zero.

5.22.1.4 Multiplexing and Assembly

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

5.22.1.4.1 Logical Channel Prioritization 5.22.1.4.1.1 General

The sidelink Logical Channel Prioritization procedure is applied whenever a new transmission is performed.
RRC controls the scheduling of sidelink data by signalling for each logical channel:
  sl-Priority where an increasing priority value indicates a lower priority level;
  sl-PrioritisedBitRate which sets the sidelink Prioritized Bit Rate (sPBR);
  sl-BucketSizeDuration which sets the sidelink Bucket Size Duration (sBSD).
RRC additionally controls the LCP procedure by configuring mapping restrictions for each logical channel:
  sl-configuredGrantType1Allowed which sets whether a configured grant Type 1 can be used for sidelink transmission;
  sl-AllowedCG-List which sets the allowed configured grant(s) for sidelink transmission;
  sl-HARQ-FeedbackEnabled which sets whether the logical channel is allowed to be multiplexed with logical channel(s) with sl-HARQ-FeedbackEnabled set to enabled or disabled.
The following UE variable is used for the Logical channel prioritization procedure:
  SBj which is maintained for each logical channel j.
The MAC entity shall initialize SBj of the logical channel to zero when the logical channel is established.
For each logical channel j, the MAC entity shall:
1> increment SBj by the product sPBR×T before every instance of the LCP procedure, where T is the time elapsed since SBj was last incremented;
1> if the value of SBj is greater than the sidelink bucket size (i.e. sPBR×sBSD):
2> set SBj to the sidelink bucket size.
NOTE: The exact moment(s) when the UE updates SBj between LCP procedures is up to UE implementation, as long as SBj is up to date at the time when a grant is processed by LCP.

5.22.1.4.1.2 Selection of Logical Channels

The MAC entity shall for each SCI corresponding to a new transmission:
1> select a Destination associated to one of unicast, groupcast and broadcast, having at least one of the MAC CE and the logical channel with the highest priority, among the logical channels that satisfy all the following conditions and MAC CE(s), if any, for the SL grant associated to the SCI:
2> SL data is available for transmission; and
2> SBj>0, in case there is any logical channel having SBj>0; and
2> sl-configuredGrantType1Allowed, if configured, is set to true in case the SL grant is a Configured Grant Type 1; and
2> sl-AllowedCG-List, if configured, includes the configured grant index associated to the SL grant; and
2> sl-HARQ-FeedbackEnabled is set to disabled, if PSFCH is not configured for the SL grant associated to the SCI.
NOTE 1: If multiple Destinations have the logical channels satisfying all conditions above with the same highest priority or if multiple Destinations have either the MAC CE and/or the logical channels satisfying all conditions above with the same priority as the MAC CE, which Destination is selected among them is up to UE implementation.

1> select the logical channels satisfying all the following conditions among the logical channels belonging to the selected Destination:
  2> SL data is available for transmission; and
  2> sl-configuredGrantType1Allowed, if configured, is set to true in case the SL grant is a Configured Grant Type 1; and.
  2> sl-AllowedCG-List, if configured, includes the configured grant index associated to the SL grant; and
    3> if PSFCH is configured for the sidelink grant associated to the SCI:
      4> sl-HARQ-FeedbackEnabled is set to enabled, if sl-HARQ-FeedbackEnabled is set to enabled for the highest priority logical channel satisfying the above conditions; or
      4> sl-HARQ-FeedbackEnabled is set to disabled, if sl-HARQ-FeedbackEnabled is set to disabled for the highest priority logical channel satisfying the above conditions.
    3> else:
      4> sl-HARQ-FeedbackEnabled is set to disabled.

NOTE 2: sl-HARQ-FeedbackEnabled is set to disabled for the transmission of a MAC PDU only carrying CSI reporting MAC CE.

5.22.1.4.1.3 Allocation of Sidelink Resources

The MAC entity shall for each SCI corresponding to a new transmission:
1> allocate resources to the logical channels as follows:
  2> logical channels selected in clause 5.22.1.4.1.2 for the SL grant with SBj>0 are allocated resources in a decreasing priority order. If the sPBR of a logical channel is set to infinity, the MAC entity shall allocate resources for all the data that is available for transmission on the logical channel before meeting the sPBR of the lower priority logical channel(s);
  2> decrement SBj by the total size of MAC SDUs served to logical channelj above;
  2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.

NOTE: The value of SBj can be negative.

The UE shall also follow the rules below during the SL scheduling procedures above:
the UE should not segment an RLC SDU (or partially transmitted SDU or retransmitted RLC PDU) if the whole SDU (or partially transmitted SDU or retransmitted RLC PDU) fits into the remaining resources of the associated MAC entity;
if the UE segments an RLC SDU from the logical channel, it shall maximize the size of the segment to fill the grant of the associated MAC entity as much as possible;
the UE should maximise the transmission of data;
if the MAC entity is given a sidelink grant size that is equal to or larger than 12 bytes while having data available and allowed (according to clause 5.22.1.4.1) for transmission, the MAC entity shall not transmit only padding;
A logical channel configured with sl-HARQ-FeedbackEnabled set to enabled and a logical channel configured with sl-HARQ-FeedbackEnabled set to disabled cannot be multiplexed into the same MAC PDU.

The MAC entity shall not generate a MAC PDU for the HARQ entity if the following conditions are satisfied:
there is no Sidelink CSI Reporting MAC CE generated for this PSSCH transmission as specified in clause 5.22.1.7; and
the MAC PDU includes zero MAC SDUs.

Logical channels shall be prioritised in accordance with the following order (highest priority listed first):
data from SCCH;
Sidelink CSI Reporting MAC CE;
data from any STCH.

5.22.1.4.2 Multiplexing of MAC Control Elements and MAC SDUs

The MAC entity shall multiplex a MAC CE and MAC SDUs in a MAC PDU according to clauses 5.22.1.4.1 and 6.1.6.

5.22.2 SL-SCH Data Reception 5.22.2.1 SCI Reception

SCI indicate if there is a transmission on SL-SCH and provide the relevant HARQ information. A SCI consists of two parts: the $1^{st}$ stage SCI on PSCCH and the $2^{nd}$ stage SCI on PSSCH as specified in clause 8.1 of TS 38.214 [7].

The MAC entity shall:
1> for each PSCCH duration during which the MAC entity monitors PSCCH:
  2> if a $1^{st}$ stage SCI has been received on the PSCCH:
    3> determine the set of PSSCH durations in which reception of a $2^{nd}$ stage SCI and the transport block occur using the received part of the SCI;
    3> if the $2^{nd}$ stage SCI for this PSSCH duration has been received on the PSSCH:
      4> store the SCI as a valid SCI for the PSSCH durations corresponding to transmission(s) of the transport block and the associated HARQ information and QoS information;
1> for each PSSCH duration for which the MAC entity has a valid SCI:
  2> deliver the SCI and the associated Sidelink transmission information to the Sidelink HARQ Entity.

5.22.2.2 Sidelink HARQ Operation 5.22.2.2.1 Sidelink HARQ Entity

There is at most one Sidelink HARQ Entity at the MAC entity for reception of the SL-SCH, which maintains a number of parallel Sidelink processes.

Each Sidelink process is associated with SCI in which the MAC entity is interested. This interest is determined by the Sidelink identification information of the SCI. The Sidelink HARQ Entity directs Sidelink transmission information and associated TBs received on the SL-SCH to the corresponding Sidelink processes.

The number of Receiving Sidelink processes associated with the Sidelink HARQ Entity is defined in TS 38.306 [5].

For each PSSCH duration, the Sidelink HARQ Entity shall:
1> for each SCI valid for this PSSCH duration:
  2> if the NDI has been toggled compared to the value of the previous received transmission corresponding to the Sidelink identification information and the Sidelink process ID of the SCI or this is the very first received transmission for the pair of the Sidelink identification information and the Sidelink process ID of the SCI:
    3> if there is a Sidelink process associated with the Sidelink identification information and the Sidelink process ID of the SCI:
      4> consider the Sidelink process as unoccupied;
      4> flush the soft buffer for the Sidelink process.

3> allocate the TB received from the physical layer and the associated Sidelink identification information and Sidelink process ID to an unoccupied Sidelink process;
3> associate the Sidelink process with the Sidelink identification information and the Sidelink process ID of this SCI and consider this transmission to be a new transmission.

NOTE 1: When a new TB arrives, the Sidelink HARQ Entity allocates the TB to any unoccupied Sidelink process. If there is no unoccupied Sidelink process in the Sidelink HARQ entity, how to manage receiving Sidelink processes is up to UE implementation.

NOTE 1a: If the NDI has not been toggled compared to the value of the previous received transmission corresponding to the Sidelink identification information and the Sidelink process ID of the SCI, and if there is no Sidelink process associated with the Sidelink identification information and the Sidelink process ID of the SCI, it is up to UE implementation to handle the corresponding TB.

1> for each Sidelink process:
2> if the NDI has not been toggled compared to the value of the previous received transmission corresponding to the Sidelink identification information and the Sidelink process ID of the SCI for the Sidelink process according to its associated SCI:
3> allocate the TB received from the physical layer to the Sidelink process and consider this transmission to be a retransmission.

NOTE 2: A single sidelink process can only be (re-) associated to a single combination of Sidelink identification information and Sidelink process ID at a time and a single combination of Sidelink identification information and Sidelink process ID can only be (re-) associated to a single sidelink process at a time.

5.22.2.2.2 Sidelink Process

For each PSSCH duration where a transmission takes place for the Sidelink process, one TB and the associated HARQ information is received from the Sidelink HARQ Entity.
For each received TB and associated Sidelink transmission information, the Sidelink process shall:
1> if this is a new transmission:
2> attempt to decode the received data.
1> else if this is a retransmission:
2> if the data for this TB has not yet been successfully decoded:
3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
2> if this is the first successful decoding of the data for this TB:
3> if this TB is associated to unicast, the DST field of the decoded MAC PDU subheader is equal to the 8 MSB of any of the Source Layer-2 ID(s) of the UE for which the 16 LSB are equal to the Destination ID in the corresponding SCI, and the SRC field of the decoded MAC PDU subheader is equal to the 16 MSB of any of the Destination Layer-2 ID(s) of the UE for which the 8 LSB are equal to the Source ID in the corresponding SCI; or
3> if this TB is associated to groupcast or broadcast and the DST field of the decoded MAC PDU subheader is equal to the 8 MSB of any of the Destination Layer-2 ID(s) of the UE for which the 16 LSB are equal to the Destination ID in the corresponding SCI:
4> deliver the decoded MAC PDU to the disassembly and demultiplexing entity;
2> consider the Sidelink process as unoccupied.
1> else:
2> instruct the physical layer to replace the data in the soft buffer for this TB with the data which the MAC entity attempted to decode.
1> if HARQ feedback is enabled by the SCI:
2> if negative-only acknowledgement is indicated by the SCI according to clause 8.4.1 of TS 38.212 [9]:
3> if UE's location information is available and distance betewen UE's location and the central location of the nearest zone that is calculated based on the Zone_id in the SCI and the value of sl-ZoneLength corresponding to the communication range requirement in the SCI as specified in TS 38.331 [5] is smaller or equal to the communication range requirement in the SCI; or
3> if none of Zone_id and communication range requirement is indicated by the SCI; or
3> if UE's location information is not available:
4> if the data which the MAC entity attempted to decode was not successfully decoded for this TB and the data for this TB was not successfully decoded before:
5> instruct the physical layer to generate a negative acknowledgement of the data in this TB.
2> if negative-positive acknowledgement or unicast is indicated by the SCI according to clause 8.4.1 of TS 38.212 [9]:
3> if the data which the MAC entity attempted to decode was successfully decoded for this TB or the data for this TB was successfully decoded before:
4> instruct the physical layer to generate a positive acknowledgement of the data in this TB.
3> else:
4> instruct the physical layer to generate a negative acknowledgement of the data in this TB.

In 3GPP 38.331([2] 3GPP TS 38.331 V16.7.0), slot offset for Uu DRX is introduced DRX-Config The IE DRX-Config is used to configure DRX related parameters.

DRX-Config Information Element

```
-- ASN1START
-- TAG-DRX-CONFIG-START
DRX-Config ::=        SEQUENCE {
    drx-onDurationTimer        CHOICE {
```

```
                            subMilliSeconds INTEGER (1..31),
                            milliSeconds    ENUMERATED {
                               ms1, ms2, ms3, ms4, ms5, ms6, ms8, ms10, ms20, ms30,
ms 40, ms50, ms60,
                               ms80, ms100, ms200, ms300, ms400, ms500, ms600,
ms800, ms1000, ms1200,
                               ms1600, spare8, spare7, spare6, spare5, spare4,
spare3, spare2, spare1 }
                            },
    drx-InactivityTimer     ENUMERATED {
                               ms0, ms1, ms2, ms3, ms4, ms5, ms6, ms8, ms10, ms20, ms30,
ms 40, ms50, ms60, ms80,
                               ms100, ms200, ms300, ms500, ms750, ms1280, ms1920,
ms2560, spare9, spare8,
                               spare7, spare6, spare5, spare4, spare3, spare2, spare1} ,
    drx-HARQ-RTT-TimerDL    INTEGER (0..56),
    drx-HARQ-RTT-TimerUL    INTEGER (0..56),
    drx-RetransmissionTimerDL  ENUMERATED {
                               sl0, sl1, sl2, sl4, sl6, sl8, sl16, sl24, sl33, sl40,
sl64, sl80, sl96, sl112, sl128,
                               sl160, sl320, spare15, spare14, spare13, spare12,
spare11, spare10, spare9,
                               spare8, spare7, spare6, spare5, spare4, spare3, spare2,
spare1},
    drx-RetransmissionTimerUL  ENUMERATED {
                               sl0, sl1, sl2, sl4, sl6, sl8, sl16, sl24, sl33, sl40,
sl64, sl80, sl96, sl112, sl128,
                               sl160, sl320, spare15, spare14, spare13, spare12,
spare11, spare10, spare9,
                               spare8, spare7, spare6, spare5, spare4, spare3, spare2,
spare1 },
    drx-LongCycleStartOffset   CHOICE {
        ms10                       INTEGER(0..9),
        ms20                       INTEGER(0..19),
        ms32                       INTEGER(0..31),
        ms40                       INTEGER(0..39),
        ms60                       INTEGER(0..59),
        ms64                       INTEGER(0..63),
        ms70                       INTEGER(0..69),
        ms80                       INTEGER(0..79),
        ms128                      INTEGER(0..127),
        ms160                      INTEGER(0..159),
        ms256                      INTEGER(0..255),
        ms320                      INTEGER(0..319),
        ms512                      INTEGER(0..511),
        ms640                      INTEGER(0..639),
        ms1024                     INTEGER(0..1023),
        ms1280                     INTEGER(0..1279),
        ms2048                     INTEGER(0..2047),
        ms2560                     INTEGER(0..2559),
        ms5120                     INTEGER(0..5119),
        ms10240                    INTEGER(0..10239)
    },
    shortDRX                   SEQUENCE {
      drx-ShortCycle             ENUMERATED {
                               ms2, ms3, ms4, ms5, ms6, ms7, ms8, ms10, ms14, ms16,
ms20, ms30, ms32,
                               ms35, ms40, ms64, ms80, ms128, ms160, ms256, ms320,
ms512, ms640, spare9,
                               spare8, spare7, spare6, spare5, spare4, spare3,
spare2, spare1 },
      drx-ShortCycleTimer        INTEGER (1..16)
    }
OPTIONAL,   -- Need R
    drx-SlotOffset             INTEGER (0..31)
}
-- TAG-DRX-CONFIG-STOP
-- ASN1STOP
```

| DRX-Config field descriptions |
| --- |
| drx-HARQ-RTT-TimerDL |
| Value in number of symbols of the BWP where the transport block was received. |
| drx-HARQ-RTT-TimerUL |
| Value in number of symbols of the BWP where the transport block was transmitted. |
| drx-InactivityTimer |
| Value in multiple integers of 1 ms. ms0 corresponds to 0, ms1 corresponds to 1 ms, ms2 corresponds to 2 ms, and so on. |
| drx-LongCycleStartOffset |
| drx-LongCycle in ms and drx-StartOffset in multiples of 1 ms. If drx-ShortCycle is configured, the value of drx-LongCycle shall be a multiple of the drx-ShortCycle value. |
| drx-onDurationTimer |
| Value in multiples of 1/32 ms (subMilliSeconds) or in ms (milliSecond). For the latter, value ms1 corresponds to 1 ms, value ms2 corresponds to 2 ms, and so on. |
| drx-RetransmissionTimerDL |
| Value in number of slot lengths of the BWP where the transport block was received. value sl0 corresponds to 0 slots, sl1 corresponds to 1 slot, sl2 corresponds to 2 slots, and so on. |
| drx-RetransmissionTimerUL |
| Value in number of slot lengths of the BWP where the transport block was transmitted. sl0 corresponds to 0 slots, sl1 corresponds to 1 slot, sl2 corresponds to 2 slots, and so on. |
| drx-ShortCycleTimer |
| Value in multiples of drx-ShortCycle. A value of 1 corresponds to drx-ShortCycle, a value of 2 corresponds to 2 * drx-ShortCycle and so on. |
| drx-ShortCycle |
| Value in ms. ms1 corresponds to 1 ms, ms2 corresponds to 2 ms, and so on. |
| drx-SlotOffset |
| Value in 1/32 ms. Value 0 corresponds to 0 ms, value 1 corresponds to 1/32 ms, value 2 corresponds to 2/32 ms, and so on. |

In 3GPP RAN2 #116 meeting ([3] 3GPP RAN2 #116-e meeting report), calculation for slot offset and start offset is discussed:

Agreements on DRX timer length and start time:
1: For UC/GC/BC, the units of Uu DRX timers are taken as baseline for the following SL-DRX parameters:
 - sl-drx-LongCycle and sl-drx-StartOffset in millisecond.
 - sl-drx-onDurationTimer in multiples of 1/32 ms (subMilliSeconds) or in ms (milliSecond).
 - sl-drx-SlotOffset in multiples of 1/32 ms.
 - sl-drx-InactivityTimer in multiple integers of 1 ms.
2: For unicast/groucast/broadcast, for sl-drx-HARQ-RTT-Timer, the granularity of starting time is at slot-level and the length is also configured in number of slots.
3: For unicast/groucast/broadcast, for sl-drx-RetransmissionTimer, the granularity of starting time is at slot-level and the length is also configured in number of slots.
4: The SL DRX timers should be calculated in the unit of physical slot. FFS whether the case may happen that no SL slots are available in UE's active time and whether/how to solve it.
5: Similar to Uu, the start of SL-DRX cycle is calculated by the following formula:
 [(DFN x 10) + subframe number] modulo (sl-drx-Cycle) = sl-drx-StartOffset
6: For unicast, for CONNECTED TX UE, RAN2 confirms that sl-drx-StartOffset and sl-drx-SlotOffset are configured to RX UE by TX UE based on gNB configuration.
7: For unicast, for IDLE/INACTIVE/OOC TX UE, RAN2 confirms that sl-drx-StartOffset and sl-drx-SlotOffset are configured to RX UE by TX UE implementation.
8: For groucast and broadcast, an equation is introduced to derive sl-drx-startoffset based on DST L2 ID.
9: RAN2 to select one of the following options to determine the sl-drx-startoffset:
 Option-1:
 - n = DST L2 ID MOD N, where N is the total number of sl-drx-startoffset values, and n is an index in the N sl-drx-startoffset values.
 Option-5:
 - sl-drx-StartOffset (ms) = DST L2 ID MOD sl-drx-LongCycle (ms)
 - FFS: sl-drx-SlotOffset
10: For groucast and broadcast, sl-drx-SlotOffset is also set based on DST L2 ID (i.e., similar to sl-drx-StartOffset).

In RAN2 #117-e meeting ([4] 3GPP RAN2 #117-e meeting report), start offset calculation is agreed:

---

Agreement on working assumptions:
1: Confirm the following working assumptions as agreements
   - Slots associated with the announced periodic transmissions by the TX UE are considered as SL active time of the RX UE.
   - For GC/BC, sl-drx-StartOffset (ms) = DST L2 ID MOD sl-drx-Cycle (ms)
   - TX/RX UE determines the on-duration timer applied for groupcast/broadcast transmissions associated with a specific L2 destination ID as the maximum on duration timer configured for any of the QoS profiles associated with that L2 destination ID.
   - When mode 1 SL grant is not in SL active time of any destination that has data to be sent, for initial transmission and the mode 1 grant is dropped, UE sends ACK to gNB.

---

In MAC CR for introducing SL DRX ([5] Draft R2-2203673 CR of TS 38.321 for Sidelink enhancement), slot offset and start offset for broadcast and group cast is calculated:
5.x.1 Behaviour of UE Receiving SL-SCH Data
When SL DRX is configured, the Active Time includes the time while:
   sl-drx-onDurationTimer or sl-drx-InactivityTimer is running; or
   sl-drx-RetransmissionTimer is running; or
   period of sl-LatencyBoundCSI-Report configured by RRC in case SL-CSI reporting MAC CE is not received; or
   the time between the transmission of the request of SL-CSI reporting and the reception of the SL-SCI reporting MAC CE in case SL-CSI reporting MAC CE is received; or
   Slot associated with the announced periodic transmissions by the UE transmitting SL-SCH Data.

When one or multiple SL DRX is configured, the MAC entity shall:
1> if multiple SL DRX Cycles that are mapped with multiple SL-QoS-Profiles of a Destination Layer-2 ID and interested cast type is associated to groupcast and broadcast:
   2> select sl-drx-Cycle whose length of the sl-drx-cycle is the shortest one among multiple SL DRX Cycles that are mapped with multiple SL-QoS-Profiles associated with the Destination Layer-2 ID:2> select sl-drx-onDurationTimer whose length of the sl-drx-onDurationTimer is the longest one among multiple SL DRX onduration timers that are mapped with multiple SL-QoS-Profiles associated with the Destination Layer-2 ID.
1> if a sl-drx-HARQ-RTT-Timer expires:
   2> if the data of the corresponding Sidelink process was not successfully decoded or if the HARQ feedback (i.e., negative acknowledgement) is not transmitted for unicast due to UL/SL prioritization:
      3> start the sl-drx-RetransmissionTimer for the corresponding Sidelink process in the first slot after the expiry of sl-drx-HARQ-RTT-Timer.

When the cast type is groupcast or broadcast as indicated by upper layer, the sl-drx-StartOffset and sl-drx-SlotOffset are derived from the following equations:

sl-drx-StartOffset (ms)=Destination Layer-2 ID modulo sl-drx-Cycle (ms).

sl-drx-SlotOffset (ms)=Destination Layer-2 ID modulo sl-drx-onDurationTimer (ms).

1> if the SL DRX cycle is used, and [(DFN×10)+subframe number] modulo (sl-drx-Cycle)=sl-drx-StartOffset:
   2> start sl-drx-onDurationTimer after sl-drx-SlotOffset from the beginning of the subframe.
1> if a SL DRX is in Active Time:
   2> monitor the SCI (i.e., $1^{st}$ stage SCI and $2^{nd}$ stage SCI) in this SL DRX.
   2> if the SCI indicates a new SL transmission:
      3> if Source Layer-1 ID of the SCI is equal to the 8 LSB of the intended Destination Layer-2 ID and Destination Layer-1 ID of the SCI is equal to the 8 LSB of the intended Source Layer-2 ID and the cast type indicator in the SCI is set to unicast:
         4> start or restart sl-drx-InactivityTimer for the corresponding Source Layer-1 ID and Destination Layer-1 ID pair after the first slot of SCI reception.
      3> if Destination Layer-1 ID of the SCI (i.e., $2^{nd}$ stage SCI) is equal to the intended Destination Layer-1 ID and the cast type indicator in the SCI is set to groupcast:4> select sl-drx-InactivityTimer whose length of the sl-drx-InactivityTimer is the largest one among multiple SL DRX Inactivity timers that are mapped to multiple SL-QoS-Profiles of Destination Layer-2 ID associated with the Destination Layer-1 ID of the SCI; and
         4> start or restart sl-drx-InactivityTimer for the corresponding Destination Layer-1 ID after the first slot of SCI reception.
   2> if the SCI indicates a SL transmission:
      3> if PSFCH resource is not configured for the SL grant associated to the SCI:
         4> start the sl-drx-HARQ-RTT-Timer for the corresponding Sidelink process in the slot following the end of PSSCH transmission (i.e., currently received PSSCH).
      3> if PSFCH resource is configured for the SL grant associated to the SCI:
         4> if HARQ feedback is enabled by the SCI and the cast type indicator in the SCI is set to unicast or groupcast;
            5> start the sl-drx-HARQ-RTT-Timer for the corresponding Sidelink process in the first slot after the end of the corresponding PSFCH transmission for the SL HARQ feedback; or
            5> start the sl-drx-HARQ-RTT-Timer for the corresponding Sidelink process in the first slot after the end of the corresponding PSFCH resource carrying the SL HARQ feedback when the SL HARQ feedback is not transmitted due to UL/SL prioritization;
         4> if HARQ feedback is disabled by the SCI and the resource(s) for one or more retransmission opportunities is not scheduled in the SCI:

5> start the sl-drx-HARQ-RTT-Timer for the corresponding Sidelink process in the slot following the end of PSFCH resource.
4> if HARQ feedback is disabled by the SCI and the resource(s) for one or more retransmission opportunities is scheduled in the SCI:
5> start the sl-drx-HARQ-RTT-Timer for the corresponding Sidelink process in the slot following the end of PSSCH transmission (i.e., currently received PSSCH).

NOTE: The sl-drx-HARQ-RTT-Timer is derived from the retransmission resource timing (i.e., immediately next retransmission resource indicated in a SCI) when a SCI indicates a retransmission resource. The UE uses the sl-drx-HARQ-RTT-Timer is configured as specified in TS 38.331 [5] when a SCI doesn't indicate a retransmission resource.

3> stop the sl-drx-RetransmissionTimer for the corresponding Sidelink process.

1> if a SL DRX Command MAC CE is received for the Source Layer-2 ID and Destination Layer-2 ID pair of a unicast:
2> stop sl-drx-onDurationTimer for the Source Layer-2 ID and Destination Layer-2 ID pair of a unicast;
2> stop sl-drx-InactivityTimer for the Source Layer-2 ID and Destination Layer-2 ID pair of a unicast.

In RRC CR of SL DRX ([6] Draft R2-2203672 RRC CR for NR Sidelink enhancement), Sidelink DRX configuration is introduced:

SL-DRX-Config-GC-BC

The IE SL-DRX-Config-GC-BC is used to configure DRX related parameters for NR sidelink groupcast and broadcast communication.

SL-DRX-Config-GC-BC Information Element

```
-- ASN1START
-- TAG-SL-DRX-CONFIG-GC-BC-START
SL-DRX-Config-GC-BC-r17 ::=              SEQUENCE {
    sl-DRX-GC-BC-PerQoS-List-r17             SEQUENCE (SIZE (1..maxSL-GC-BC-DRX-QoS-r17)) OF SL-
DRX-GC-BC-QoS-r17          OPTIONAL,    -- Need M
    sl-DRX-GC-BC-PerDest-List-r17            SEQUENCE (SIZE (1..maxSL-GC-BC-DRX-Dest-r17)) OF SL-
DRX-GC-BC-Dest-r17         OPTIONAL,    -- Need M
    sl-DRX-GC-generic-r17                    SL-DRX-GC-Generic-r17
OPTIONAL,  -- Need M
    sl-DefaultDRX-GC-BC-r17                  SL-DRX-GC-BC-QoS-r17
OPTIONAL,  -- Need M
    ...
}
SL-DRX-GC-BC-QoS-r17          ::=        SEQUENCE {
    sl-DRX-GC-BC-MappedQoS-FlowList-r17      SEQUENCE (SIZE (1..maxNrofSL-QFIs-r16)) OF SL-QoS-
Profile-r16                OPTIONAL,    -- Need M
    sl-DRX-GC-BC-OnDurationTimer-r17         CHOICE {
                                                subMilliSeconds INTEGER (1..31),
                                                milliSeconds   ENUMERATED
                                                    ms1, ms2, ms3, ms4, ms5, ms6, ms8, ms10,
ms20, ms30, ms40, ms50, ms60,
                                                    ms80, ms100, ms200, ms300, ms400, ms500,
ms600, ms800, ms1000, ms1200,
                                                    ms1600, spare8, spare7, spare6, spare5,
spare4, spare3, spare2, spare1 }
                                             },
    sl-DRX-GC-InactivityTimer-r17            ENUMERATED {
                                                ms0, ms1, ms2, ms3, ms4, ms5, ms6, ms8, ms10,
ms20, ms30, ms40, ms50, ms60, ms80,
                                                ms100, ms200, ms300, ms500, ms750, ms1280,
ms1920, ms2560, spare9, spare8,
                                                spare7, spare6, spare5, spare4, spare3, spare2,
spare1},
    sl-DRX-GC-BC-Cycle-r17                   ENUMERATED {
                                                ms10, ms20, ms32, ms40, ms60, ms64, ms70, ms80,
ms128, ms160, ms256, ms320, ms512,
                                                ms640, ms1024, ms1280, ms2048, ms2560, ms5120,
ms10240, spare12, spare11, spare10,
                                                spare9, spare8, spare7, spare6, spare5, spare4,
spare3, spare2, spare1 },
}
SL-DRX-GC-BC-Dest-r17         :: =       SEQUENCE {
    sl-DRX-GC-BC-StartOffset-r17             CHOICE {
                                                ENUMERATED {FFS}
},
...
}
SL-DRX-GC-Generic-r17         ::=        SEQUENCE {
    sl-DRX-GC-HARQ-RTT-Timer                 ENUMERATED {sl0, sl1, sl2, sl4, spare4, spare3, spare2,
spare1},
    sl-DRX-GC-RetransmissionTimer            ENUMERATED {
                                                sl0, sl1, sl2, sl4, sl6, sl8, sl16, sl24, sl33,
sl40, sl64, sl80, sl96, sl112, sl128,
                                                sl160, sl320, spare15, spare14, spare13, spare12,
spare11, spare10, spare9,
                                                spare8, spare7, spare6, spare5, spare4, spare3,
spare2, spare1}
```

}
-- TAG-SL-DRX-CONFIG-GC-BC-STOP
-- ASN1STOP

| SL-DRX-Config-GC-BC field descriptions |
|---|
| sl-DefaultDRX-GC-BC-r17 |
| Indicates the default sidelink DRX configuration for groupcast and broadcast communications, which is used for QoS profile(s) that cannot be mapped into DRX configuration(s) configured for dedicated QoS profile(s). This field can be applied for the broadcast based or unicast based communication of Direct Link Establishment Request as described in TS 24.587 [xx]. |
| sl-DRX-GC-BC-PerQoS-List |
| List of one or multiple sidelink DRX configurations for groupcast and broadcast communication, which are mapped from QOS profile(s). |
| sl-DRX-GC-BC-PerDest-List |
| List of one or multiple sidelink DRX configurations for groupcast and broadcast communication, which are set based on Destination Layer-2 ID. |
| sl-DRX-GC-BC-Cycle |
| Value in ms, ms10 corresponds to 10 ms, ms20 corresponds to 20 ms, ms32 corresponds to 32 ms, and so on. |
| sl-DRX-GC-BC-MappedQoS-FlowsList |
| List of QoS profiles of the NR sidelink communication, which are mapped to a sidelink DRX configuration. |
| sl-DRX-GC-BC-OnDurationTimer |
| Value in multiples of 1/32 ms (subMilliSeconds) or in ms (milliSecond). For the latter, value ms1 corresponds to 1 ms, value ms2 corresponds to 2 ms, and so on. |
| sl-DRX-GC-HARQ-RTT-Timer |
| Value in number of slot lengths of the BWP where the transport block was received. Value sl0 corresponds to 0 slots, sl1 corresponds to 1 slot, sl2 corresponds to 2 slots, and so on. |
| sl-DRX-GC-Generic |
| Indicates a sidelink DRX configuration, which is applicable to any QoS profile or any Destination Layer-2 ID. |
| sl-DRX-GC-InactivityTimer |
| Value in multiple integers of 1 ms, ms0 corresponds to 0, ms1 corresponds to 1 ms, ms2 corresponds to 2 ms, and so on. This field is only valid for groupcast communication. |
| sl-DRX-GC-RetransmissionTimer |
| Value in number of slot lengths of the BWP where the transport block was received. Value sl0 corresponds to 0 slots, sl1 corresponds to 1 slot, sl2 corresponds to 2 slots, and so on. |
| SL-DRX-GC-BC-Dest |
| This field indicates the sidelink DRX related parameter(s) for groupcast and broadcast communication, which are set based on Destination Layer-2 ID. |
| sl-DRX-GC-BC-StartOffset |
| Value in multiple integers of 1 ms, ms0 corresponds to 0, ms1 corresponds to 1 ms, ms2 corresponds to 2 ms, and so on. |

In [7] 3GPP TS 38.211 V16.8.0, paragraphs related to a number of slots within one subframe or 1 milliseconds are quoted below.
4 Frame structure and physical resources
4.1 General
Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Throughout this specification, unless otherwise noted, statements using the term "UE" in clauses 4, 5, 6, or 7 are equally applicable to the IAB-MT part of an IAB-node.
4.2 Numerologies
Multiple OFDM numerologies are supported as given by Table 4.2-1 where μ and the cyclic prefix for a downlink or uplink bandwidth part are obtained from the higher-layer parameters subcarrierSpacing and cyclicPrefix, respectively.

Figures 5, 6:
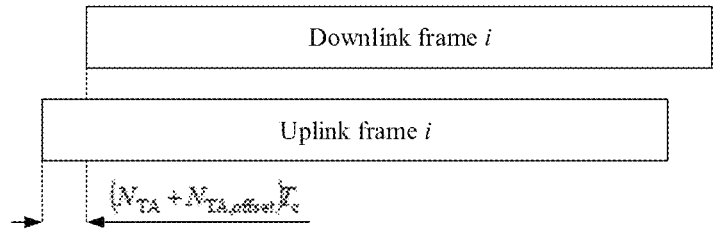
FIG. 5 is a reproduction of Table 4.2-1: Supported transmission numerologies, from 3GPP TS 38.211 V16.8.0.
FIG. 6 is a reproduction of FIG. 4.3.1-1: Uplink-downlink timing relation, from 3GPP TS 38.211 V16.8.0.

FIG. 5 is a reproduction of Table 4.2-1: Supported transmission numerologies, from 3GPP TS 38.211 V16.8.0.
4.3 Frame Structure
4.3.1 Frames and Subframes
Downlink, uplink, and sidelink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TA,offset}$ is given by [5, TS 38.213], except for msgA transmission on PUSCH where $N_{TA}=0$ shall be used.

FIG. 6 is a reproduction of FIG. 4.3.1-1: Uplink-downlink timing relation, from 3GPP TS 38.211 V16.8.0.

4.3.2 Slots

For subcarrier spacing configuration µ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{subframe,\mu}-1\}$ in increasing order within a frame. There are $N_s^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot in a downlink or uplink frame can be classified as 'downlink', 'flexible', or 'uplink'. Signaling of slot formats is described in clause 11.1 of [5, TS 38.213]. In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N_{Rx-Tx}T_c$ after the end of the last received downlink symbol in the same or different cell within the group of cells where $N_{Rx-Tx}$ is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than $N_{Tx-Rx}T_c$ after the end of the last transmitted uplink symbol in the same or different cell within the group of cells where $N_{Tx-Rx}$ is given by Table 4.3.2-3.

For DAPS handover operation, a UE not capable of full-duplex communication is not expected to transmit in the uplink to a cell earlier than $N_{Rx-Tx}T_c$ after the end of the last received downlink symbol in the different cell where $N_{Rx-Tx}$ is given by Table 4.3.2-3.

For DAPS handover operation, a UE not capable of full-duplex communication is not expected to receive in the downlink from a cell earlier than $N_{Tx-Rx}T_c$ after the end of the last transmitted uplink symbol in the different cell where $N_{Tx-Rx}$ is given by Table 4.3.2-3.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Tx-Rx}T_c$ after the end of the last transmitted uplink symbol in the same cell where $N_{Tx-Rx}$ is given by Table 4.3.2-3.

FIG. 7 is a reproduction of Table 4.3.2-1: Number of OFDM symbols per slot, slots per frame, and slots per subframe for normal cyclic prefix, from 3GPP TS 38.211 V16.8.0.

FIG. 8 is a reproduction of Table 4.3.2-2: Number of OFDM symbols per slot, slots per frame, and slots per subframe for extended cyclic prefix, from 3GPP TS 38.211 V16.8.0.

FIG. 9 is a reproduction of Table 4.3.2-3: Transition time N_"Rx-Tx" and N_"Tx-Rx", from 3GPP TS 38.211 V16.8.0.

In New Radio ($N_R$), a Sidelink (SL) User Equipment (UE) could perform SL communication (e.g., unicast, groupcast, and/or broadcast) with one or more other UEs. In Release 17 NR, SL Discontinuous reception (DRX) is introduced. A receiver (Rx) UE could monitor Physical Sidelink Control Channel (PSCCH) and/or Sidelink Control Information (SCI) discontinuously based on sidelink DRX configuration. The sidelink DRX configuration could be configured by a network or provided/configured by a transmitter (Tx) UE. In groupcast and broadcast, the drx start offset and drx slot offset is calculated by the Rx UE via at least destination Identity (ID) (e.g., Destination Layer-2 ID associated with the groupcast group or the broadcast/groupcast transmission). According to MAC CR (e.g., [5] Draft R2-2203673 CR of TS 38.321 for Sidelink enhancement), the start offset is calculated via:

sl-drx-StartOffset (ms)=Destination Layer-2 ID modulo sl-drx-Cycle (ms).

Figure 10:
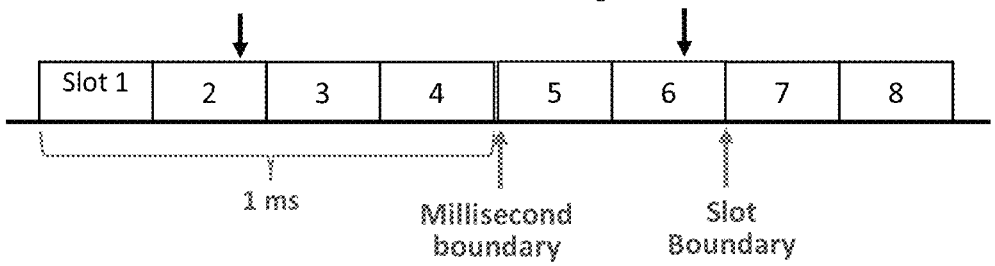
FIG. 10 is a diagram example showing problems of a derived slot offset not aligned with the slot boundary, and a derived slot offset larger than 1 ms, in accordance with embodiments of the present invention.

And the slot offset is calculated via:

sl-drx-SlotOffset (ms)=Destination Layer-2 ID modulo sl-drx-onDurationTimer (ms).

Wherein the slot offset (e.g., sl-drx-SlotOffset) is derived from modulus of destination ID divided by on-duration timer (length) (in the unit of milliseconds). Based on the calculation, one issue could occur when the derived slot offset, based on modulus of destination ID divided by on-duration timer (length), may not align to the slot boundary. One example is shown in FIG. 10. For a sidelink bandwidth part (BWP) or carrier configured with 4 slots in one millisecond/subframe (e.g., subcarrier spacing configuration u=2, or subcarrier spacing is configured as 60 kHz), when sl-drx-onDurationTimer is 31 (in unit of 1/32 ms) and destination layer-2 ID is 10, the derived slot offset is 10 (in unit of 1/32 ms) and does not align with the slot boundary, which could lead to ambiguity on UE behaviour regarding which slot to start DRX timers. For the sidelink BWP or carrier configured with 4 slots in one millisecond/subframe, slot offset to align with the slot boundary may be 0, 8, 16, 24 (in unit of 1/32 ms). Another issue could occur when the derived slot offset is larger than 1 ms. For example, when sl-drx-onDurationTimer is 80 ms and Destination Layer-2 ID is 10, the derived slot offset is 10 ms, which is beyond the millisecond boundary and defies the function of slot offset. The UE may not start the DRX timers without waiting for a long period of time, which could lead to poor performance of DRX operation on sidelink.

One concept of the invention is that a UE could determine or derive a slot offset for a SL communication based on a destination ID (e.g., Destination Layer-2 ID) of the SL communication and number of slots in one millisecond/subframe. For example, the slot offset could be modulus of the destination ID divided by the number of slots in one millisecond/subframe or in one frame (e.g., numberOfSlotsPerFrame). The number of slots could be number of consecutive slots per frame/subframe.

sl-drx-SlotOffset (slot)=Destination Layer-2 ID modulo number of slots in one millisecond (slot).

sl-drx-SlotOffset (slot)=Destination Layer-2 ID modulo numberOfSlotsPerFrame (slot).

sl-drx-SlotOffset (slot)=Destination Layer-2 ID
    modulo numberOfSlotsPerSubframe (slot).

Preferably in various embodiments, the number of slots in one millisecond/subframe may be determined or derived based on following table in TS 38.211, wherein u is based on subcarrier spacing configuration.

Number of OFDM symbols per slot, slots per frame, and slots per subframe for normal cyclic prefix:

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Additionally and/or alternatively, the slot offset could be derived based on modulus of the destination ID divided by a predefined number (e.g., 2, 4, 8, 16, 32, . . . ). The pre-defined number could be specified, (pre-)configured, or provided by a network or Tx UE.

sl-drx-SlotOffset (slot)=Destination Layer-2 ID
    modulo fixed or pre-defined number (slot).

Figure 11:
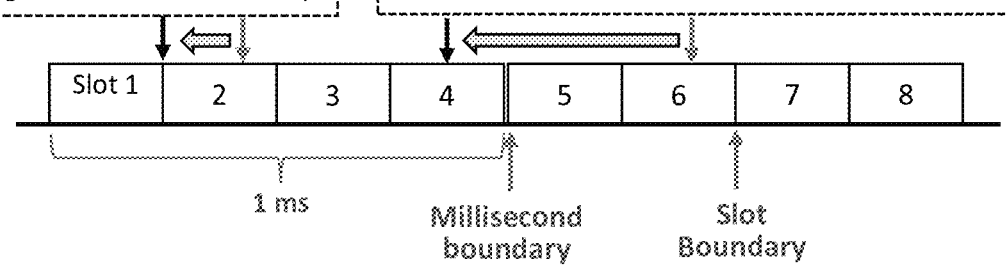
FIG. 11 is a diagram example showing solutions that align the derived slot offset with the slot boundary, and keep the derived slot offset smaller than 1 ms, in accordance with embodiments of the present invention.

Additionally and/or alternatively, the slot offset could be derived based on modulus of the destination ID divided by a predefined number (e.g., 32) or on-duration timer (length). The slot offset could be the modulus rounded up or down to (the closet) slot boundary or to a specific slot boundary. An example is shown in FIG. 11. The carrier or the bandwidth part is configured with 4 slots in one millisecond. When the on-duration timer (length) is 31 (1/32 ms), and destination Layer-2 ID is 10, the modulus of the destination Layer-2 ID divided by the on-duration timer is 10 (1/32 ms). The UE could derive slot offset by rounding down (e.g., floor function) to the nearest slot boundary less than or equal to the modulus, wherein in this example, the starting boundary of the $2^{nd}$ slot (e.g., 8/32 ms). Alternatively, the UE could derive slot offset by rounding up (e.g., ceiling function) to the nearest slot boundary larger than or equal to the modulus, wherein in this example, the starting boundary of the $3^{rd}$ slot (e.g., 16/32 ms). Alternatively, if the modulus of slot offset is not aligned to slot boundary, the UE could derive slot offset as the first slot after modulus of slot offset, wherein in this example, the $3^{rd}$ slot boundary.

sl-drx-SlotOffset(1/32 ms)=Destination Layer-2 ID
    modulo 32(1/32 ms) round up/down to slot
    boundary.

sl-drx-SlotOffset(1/32 ms)=Destination Layer-2 ID
    modulo sl-drx-ondurationtimer(1/32 ms) round
    up/down to slot boundary.

Additionally and/or alternatively, the UE may not round up/down the modulus to the nearest slot boundary for deriving the slot offset. The UE may not monitor Sidelink Control Information/Physical Sidelink Control Channel (SCI/PSCCH) if it is not a complete PSCCH occasion. For example, the UE may not monitor a PSCCH occasion in a (sidelink) slot if or when the slot offset is in the middle of the (sidelink) slot. The UE may not monitor SCI/PSCCH in one sidelink slot if the one sidelink slot is not completely in sidelink active time (e.g., the sidelink active time starts or ends in the middle of the one sidelink slot).

Additionally and/or alternatively, the slot offset could be derived based on modulus of the destination ID divided by on-duration timer (length) and also by a predefined number (e.g., 32). It can induce that slot offset is smaller than 1 millisecond. Furthermore, the slot offset could be the modulus rounded up or down to (the closet) slot or subframe boundary or to a specific slot boundary. Alternatively, the UE may not round up/down the modulus to the nearest slot boundary for deriving the slot offset.

sl-drx-SlotOffset(unit: 1/32 ms)=[Destination Layer-2
    ID modulo sl-drx-onDurationTimer] modulo 32
    (unit: 1/32 ms).

An example is shown in FIG. 11. The sl-drx-onDurationTimer is 100 ms and the Destination ID is 130. The modulus of destination ID divided by sl-drx-onDurationTimer is 30 ms, which is beyond subframe boundary. The UE could derive a slot offset based on a second modulus of the modulus divided by 32, which gives 30/32 in the unit of 1/32 ms.

Preferably in various embodiments, transformation from "slot" to "milliseconds" may be as follows:

$sl-drx-SlotOffset$ (ms) =

[Destination Layer − 2 ID modulo $numberOfSlotsPerSubFrame$] ∗

$$\frac{1}{\text{number of slots in one millisecond}} \text{ (ms)}.$$

$sl-drx-SlotOffset$ (ms) =

[Destination Layer − 2 ID modulo $numberOfSlotsPerSubFrame$] ∗

$$\frac{1}{numberOfSlotsPerFrame} \text{ (ms)}.$$

$sl-drx-SlotOffset$ (ms) =

[Destination Layer − 2 ID modulo $numberOfSlotsPerSubFrame$] ∗

$$\frac{1}{numberOfSlotsPerSubframe} \text{ (ms)}.$$

Preferably in various embodiments, number of slots in one millisecond, or numberOfSlotsPerSubframe could be determined or derived based on subcarrier spacing or numerology of a SL BWP.

Figure 12:
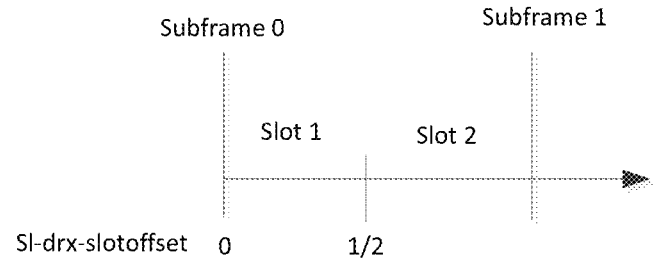
FIG. 12 is a diagram example showing that the number of slots per subframe is 2, and for each Destination ID, the UE can derive the slot offset based on a remainder of the Destination ID divided by the number of slots per subframe, in accordance with embodiments of the present invention.

An example is shown in FIG. 12. The number of slots per subframe (of a SL BWP) is 2. For each Destination ID (for groupcast or broadcast), the UE could derive sl-drx-SlotOffset based on a remainder of the Destination ID divided by the number of slots per subframe (2 in this example), wherein the slot offset is the remainder divided by the number of slots per subframe (e.g., remainder=0, slot offset=0/2; remainder=1, slot offset=1/2).

Figure 13:
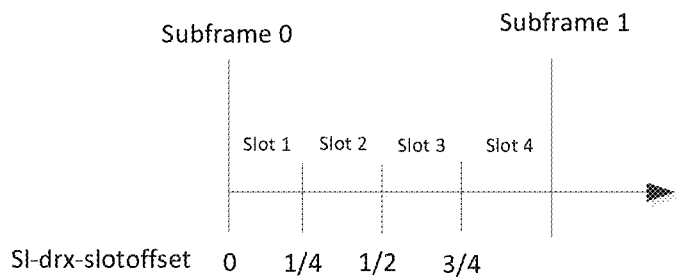
FIG. 13 is a diagram example showing that the number of slots per subframe is 4, and for each Destination ID, the UE can derive the slot offset based on a remainder of the Destination ID divided by the number of slots per subframe, in accordance with embodiments of the present invention.

Another example is shown in FIG. 13. The number of slots per subframe (of a SL BWP) is 4. For each Destination ID (for groupcast or broadcast), the UE could derive sl-drx-SlotOffset based on a remainder of the Destination ID divided by the number of slots per subframe (4 in this example), wherein the slot offset is the remainder divided by the number of slots per subframe (e.g., remainder=0, slot offset=0/4; remainder=1, slot offset=1/4, remainder=2, slot offset=2/4, remainder=3, slot offset=3/4).

Preferably in various embodiments, for subcarrier spacing being as $15*2^\mu$ kHz, number of slots in one millisecond is $2^\mu$.

Preferably in various embodiments,

μ=0, 1, 2, 3, 4, 5 according to numerology or subcarrier spacing of SL BWP.

Preferably in various embodiments, slot boundary is based on $i*32/2^\mu$(1/32 ms), wherein i=0, 1, . . . $2^\mu-1$.

Preferably in various embodiments, sl-drx-SlotOffset (ms)={round down [Destination Layer-2 ID modulo 32] in unit of $$\left(\dfrac{32}{\substack{\text{number of slots}\\ \text{in one millisecond}}}\right)\right\} * \left(\dfrac{1}{\substack{\text{number of slots}\\ \text{in one millisecond}}}\right) \text{(ms.)}$$

Preferably in various embodiments, sl-drx-SlotOffset (ms)={round up [Destination Layer-2 ID modulo 32] in unit of $$\left(\dfrac{32}{\substack{\text{number of slots}\\ \text{in one millisecond}}}\right)\right\} * \left(\dfrac{1}{\substack{\text{number of slots}\\ \text{in one millisecond}}}\right) \text{(ms.)}$$

For example, for SCS=60 kHz, and there are 4 slots in one subframe, if destination Layer-2 ID=26 (in unit of decimal value), $$sl\text{-}drx\text{-}SlotOffset \text{ (ms)} = \left\{26 \text{ round down in unit of } \dfrac{32}{4}\right\} * \dfrac{1}{4}\text{(ms)}.$$

In this example, $$sl\text{-}drx\text{-}SlotOffset \text{ (ms)} = \dfrac{3}{4} \text{ (ms)}.$$

Preferably in various embodiments, for a sidelink group, a UE determines starting timing of on-duration timer based on a derived sl-drx-SlotOffset.

Preferably in various embodiments, the UE starts on-duration timer for monitoring (groupcast) sidelink transmission at least for the group based on at least a derived sl-drx-SlotOffset.

Preferably in various embodiments, for unicast sidelink DRX configuration, starting timing of on-duration timer is based on higher layer configuration (instead of derived based on destination ID).

Preferably in various embodiments, sl-drx-SlotOffset (ms) which is derived for a starting timing of on-duration timer shall be aligned with slot boundary (in unit of ms).

Preferably in various embodiments, sl-drx-SlotOffset (1/32 ms) which is derived for a starting timing of on-duration timer shall be aligned with slot boundary (1/32 ms).

Preferably in various embodiments, for unicast sidelink DRX configuration, candidate value of sl-drx-SlotOffset in higher layer configuration (e.g., via vehicle-to-everything (V2X) layer, network or Tx UE configuration) could be 0, 1, 2, 3, . . . 31 (in unit of 1/32 ms).

Preferably in various embodiments, for groupcast sidelink DRX, candidate value of sl-drx-SlotOffset shall be i*32/2^µ, wherein i=0, 1, . . . (2^µ−1) (in unit of 1/32 ms).

Preferably in various embodiments, for groupcast sidelink DRX, for value(s) other than i*32/2^µ in a set of value {0, 1, . . . 31}, wherein i=0, 1, . . . (2^µ−1), is not allowed to use or apply for sl-drx-SlotOffset.

For all concepts, embodiments, and examples above and herein:

The SL communication could be groupcast or broadcast communication.

The SL communication may not be unicast communication.

The slot offset could be in unit of slots or in unit of milliseconds.

The UE could be a Rx UE in a SL communication.

The UE could start an on-duration timer after the time indicated in the slot offset from the beginning of a subframe.

All concepts, embodiments and examples above can be merged into new concepts and/or new concept combinations.

Figure 14:
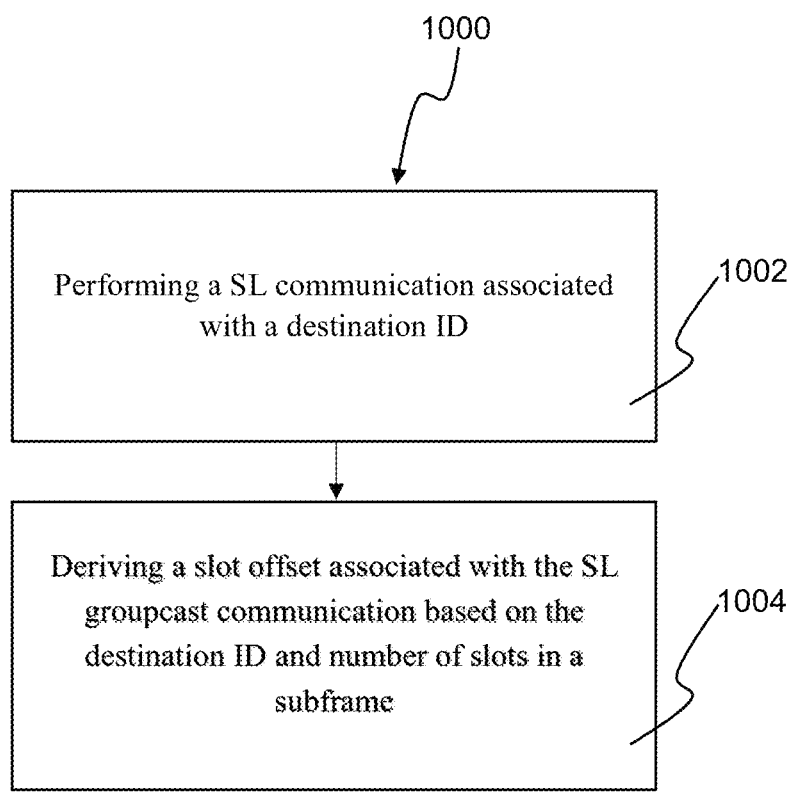
FIG. 14 is a flow diagram of a UE deriving a slot offset associated with a SL groupcast communication based on a destination ID and number of slots in a subframe, in accordance with embodiments of the present invention.

Referring to FIG. 14, with this and other concepts, systems, and methods of the present invention, a method 1000 for a UE in a wireless communication system comprises performing a SL communication associated with a destination ID (step 1002) and deriving a slot offset associated with the SL groupcast communication based on the destination ID and number of slots in a subframe (step 1004).

In various embodiments, the slot offset is derived via a modulus of the destination ID divided by the number of slots in a subframe.

In various embodiments, the number of slots in a subframe is configured by a network.

In various embodiments, the number of slots in a subframe is associated with a SL BWP.

In various embodiments, the slot offset is sl-drx-slotoffset.

Referring back to FIGS. 3 and 4, in one or more embodiments from the perspective of a UE, the device 300 includes a program code 312 stored in memory 310 of the transmitter. The CPU 308 could execute program code 312 to: (i) perform a SL communication associated with a destination ID; and (ii) derive a slot offset associated with the SL groupcast communication based on the destination ID and number of slots in a subframe. Moreover, the CPU 308 can execute the program code 312 to perform all of the described actions, steps, and methods described above, below, or otherwise herein.

Figure 15:
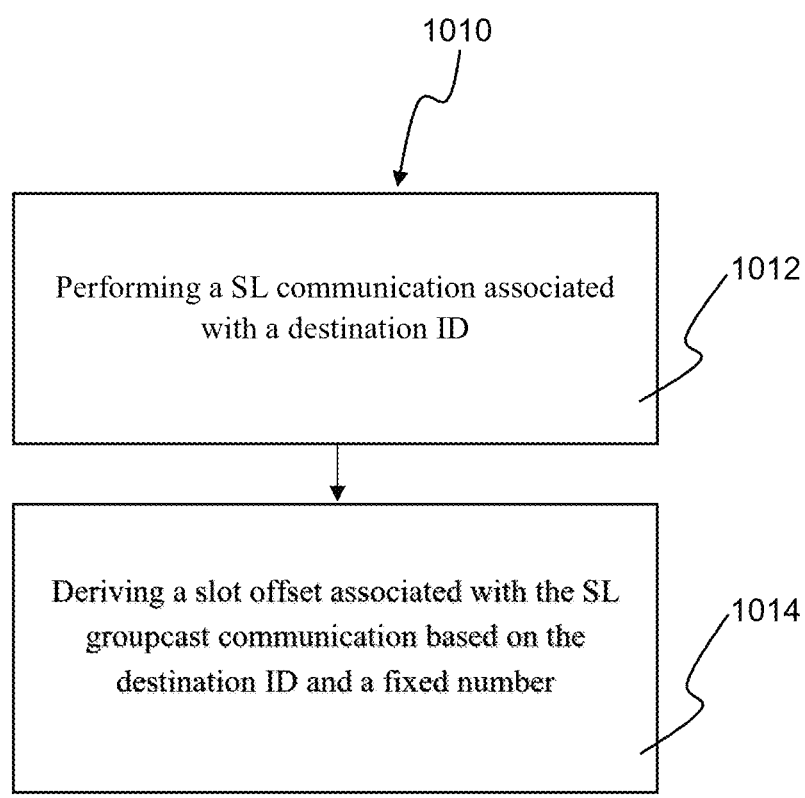
FIG. 15 is a flow diagram of a UE deriving a slot offset associated with a SL groupcast communication based on a destination ID and a fixed number, in accordance with embodiments of the present invention.

Referring to FIG. 15, with this and other concepts, systems, and methods of the present invention, a method 1010 for a UE in a wireless communication system comprises performing a SL communication associated with a destination ID (step 1012) and deriving a slot offset associated with the SL groupcast communication based on the destination ID and a fixed number (step 1014).

In various embodiments, the slot offset is derived via a modulus of the destination ID divided by the fixed number.

In various embodiments, the fixed number is configured by a network.

In various embodiments, the fixed number is 2, 4, 8, 16, or 32.

In various embodiments, the SL communication is a groupcast or broadcast.

Referring back to FIGS. 3 and 4, in one or more embodiments from the perspective of a UE, the device 300 includes a program code 312 stored in memory 310 of the transmitter. The CPU 308 could execute program code 312 to: (i) perform a SL communication associated with a destination ID; and (ii) derive a slot offset associated with the SL groupcast communication based on the destination ID and a fixed number. Moreover, the CPU 308 can execute the program code 312 to perform all of the described actions, steps, and methods described above, below, or otherwise herein.

Figure 16:
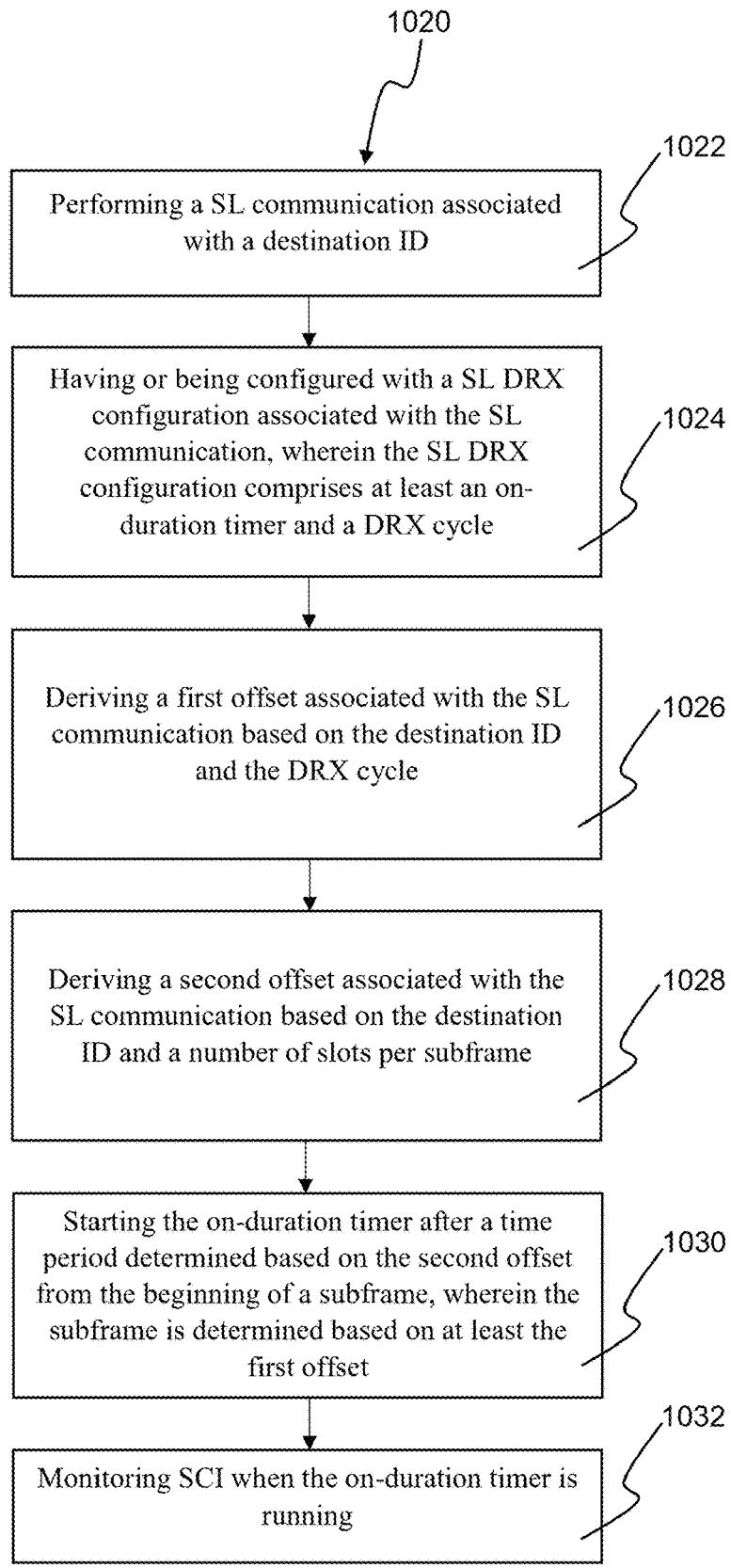
FIG. 16 is a flow diagram of a UE deriving first and second offsets associated with a SL communication, starting an on-duration timer after a time period, and monitoring SCI when the on-duration timer is running, in accordance with embodiments of the present invention.

Referring to FIG. 16, with this and other concepts, systems, and methods of the present invention, a method 1020 for a UE in a wireless communication system comprises performing a SL communication associated with a destination ID (step 1022), having or being configured with a SL DRX configuration associated with the SL communication, wherein the SL DRX configuration comprises at least an on-duration timer and a DRX cycle (step 1024), deriving a first offset associated with the SL communication based on the destination ID and the DRX cycle (step 1026), deriving a second offset associated with the SL communication based on the destination ID and a number of slots per subframe (step 1028), starting the on-duration timer after a time period determined based on the second offset from the beginning of a subframe, wherein the subframe is determined based on at least the first offset (step 1030), and monitoring SCI when the on-duration timer is running (step 1032).

In various embodiments, the second offset is derived by a first value divided by the number of slots per subframe, wherein the first value is a remainder of the destination ID divided by the number of slots per subframe.

In various embodiments, the first offset is a start offset or sl-drx-StartOffset.

In various embodiments, the second offset is a slot offset or sl-drx-SlotOffset.

In various embodiments, the SL DRX configuration comprises at least the on-duration timer means the SL DRX configuration comprising a time duration length of the on-duration timer, and/or the SL DRX configuration comprising at least the DRX cycle means the SL DRX configuration comprising a time duration length of the DRX cycle.

In various embodiments, the SL communication is groupcast communication or broadcast communication.

In various embodiments, the second offset is in units of milliseconds.

In various embodiments, the subframe satisfies a remainder of a number associated with the subframe divided by the DRX cycle equals the first offset, and/or the number associated with the subframe is equal to ((frame number of the subframe×10)+(a subframe number of the subframe)).

In various embodiments, the second offset is set to (the destination ID modulo the number of slots per subframe)/ (the number of slots per subframe).

In various embodiments, the number of slots per subframe is a number of slots per subframe in a SL BWP, wherein the UE performs the SL communication in the SL BWP, and/or the number of slots per subframe is associated with a numerology or a subcarrier spacing of the SL BWP, and/or the number of slots per subframe is one of 1, 2, 4, 8, 16 or 32, based on the numerology or the subcarrier spacing of the SL BWP Referring back to FIGS. 3 and 4, in one or more embodiments from the perspective of a UE, the device 300 includes a program code 312 stored in memory 310 of the transmitter. The CPU 308 could execute program code 312 to: (i) perform a SL communication associated with a destination ID; (ii) be configured with or having a SL DRX configuration associated with the SL communication, wherein the SL DRX configuration comprises at least an on-duration timer and a DRX cycle; (iii) derive a first offset associated with the SL communication based on the destination ID and the DRX cycle; (iv) derive a second offset associated with the SL communication based on the destination ID and a number of slots per subframe; (v) start the on-duration timer after a time period determined based on the second offset from the beginning of a subframe, wherein the subframe is determined based on at least the first offset; and (vi) monitor SCI when the on-duration timer is running. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:
performing a Sidelink (SL) communication associated with a destination Identity (ID);
having, or being configured with, a SL Discontinuous Reception (DRX) configuration for at least an on-duration timer and a DRX cycle associated with the SL communication;
deriving a first offset associated with the SL communication based on the destination ID and the DRX cycle;
deriving a second offset associated with the SL communication based on the destination ID and a number of slots per subframe, wherein at least one of:
the second offset is derived by a first value divided by the number of slots per subframe, wherein the first value is a remainder of the destination ID divided by the number of slots per subframe; or
the second offset is set to (the destination ID modulo the number of slots per subframe)/(the number of slots per subframe);
starting the on-duration timer after a time period determined based on the second offset from the beginning of a subframe, wherein the subframe is determined based on at least the first offset; and
monitoring Sidelink Control Information (SCI) when the on-duration timer is running.

2. The method of claim 1, wherein the first offset is a start offset or sl-drx-StartOffset.

3. The method of claim 1, wherein the second offset is a slot offset or sl-drx-SlotOffset.

4. The method of claim 1, wherein:
the SL DRX configuration comprises at least the on-duration timer means the SL DRX configuration comprises a time duration length of the on-duration timer; and/or
wherein the SL DRX configuration comprising at least the DRX cycle means the SL DRX configuration comprises a time duration length of the DRX cycle.

5. The method of claim 1, wherein the SL communication is groupcast communication or broadcast communication.

6. The method of claim 1, wherein the second offset is in units of milliseconds.

7. The method of claim 1, wherein:
the subframe satisfies a remainder of a number associated with the subframe divided by the DRX cycle equals the first offset; and/or
the number associated with the subframe is equal to ((frame number of the subframe×10)+(a subframe number of the subframe)).

8. The method of claim 1, wherein:
the number of slots per subframe is a number of slots per subframe in a SL Bandwidth Part (BWP), wherein the UE performs the SL communication in the SL BWP; and/or
the number of slots per subframe is associated with a numerology or a subcarrier spacing of the SL BWP; and/or
the number of slots per subframe is one of 1, 2, 4, 8, 16 or 32, based on the numerology or the subcarrier spacing of the SL BWP.

9. A User Equipment (UE), comprising:
a memory; and
a processor operatively coupled to the memory, wherein the processor is configured to execute program code to:
perform a Sidelink (SL) communication associated with a destination Identity (ID);
have, or be configured with, a SL Discontinuous Reception (DRX) configuration for at least an on-duration timer and a DRX cycle associated with the SL communication;
derive a first offset associated with the SL communication based on the destination ID and the DRX cycle;

derive a second offset associated with the SL communication based on the destination ID and a number of slots per subframe, wherein at least one of:
the second offset is derived by a first value divided by the number of slots per subframe, wherein the first value is a remainder of the destination ID divided by the number of slots per subframe; or
the second offset is set to (the destination ID modulo the number of slots per subframe)/(the number of slots per subframe);
start the on-duration timer after a time period determined based on the second offset from the beginning of a subframe, wherein the subframe is determined based on at least the first offset; and
monitor Sidelink Control Information (SCI) when the on-duration timer is running.

10. The UE of claim 9, wherein the first offset is a start offset or sl-drx-StartOffset.

11. The UE of claim 9, wherein the second offset is a slot offset or sl-drx-SlotOffset.

12. The UE of claim 9, wherein:
the SL DRX configuration comprises at least the on-duration timer means the SL DRX configuration comprises a time duration length of the on-duration timer; and/or
wherein the SL DRX configuration comprising at least the DRX cycle means the SL DRX configuration comprises a time duration length of the DRX cycle.

13. The UE of claim 9, wherein the SL communication is groupcast communication or broadcast communication.

14. The UE of claim 9, wherein the second offset is in units of milliseconds.

15. The UE of claim 9, wherein:
the subframe satisfies a remainder of a number associated with the subframe divided by the DRX cycle equals the first offset; and/or
the number associated with the subframe is equal to ((frame number of the subframe×10)+(a subframe number of the subframe)).

16. The UE of claim 9, wherein:
the number of slots per subframe is a number of slots per subframe in a SL Bandwidth Part (BWP), wherein the UE performs the SL communication in the SL BWP; and/or
the number of slots per subframe is associated with a numerology or a subcarrier spacing of the SL BWP; and/or
the number of slots per subframe is one of 1, 2, 4, 8, 16 or 32, based on the numerology or the subcarrier spacing of the SL BWP.

* * * * *